(12) United States Patent
Lee et al.

(10) Patent No.: US 11,343,530 B2
(45) Date of Patent: May 24, 2022

(54) IMAGE ENCODING/DECODING METHOD AND DEVICE, AND RECORDING MEDIUM HAVING BITSTREAM STORED THEREON

(71) Applicant: ELECTRONICS AND TELECOMMUNICATIONS RESEARCH INSTITUTE, Daejeon (KR)

(72) Inventors: Ha Hyun Lee, Seoul (KR); Jung Won Kang, Daejeon (KR); Hyun Suk Ko, Daejeon (KR); Sung Chang Lim, Daejeon (KR); Jin Ho Lee, Daejeon (KR); Dong San Jun, Daejeon (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 29 days.

(21) Appl. No.: 16/461,388

(22) PCT Filed: Nov. 28, 2017

(86) PCT No.: PCT/KR2017/013673
§ 371 (c)(1),
(2) Date: May 16, 2019

(87) PCT Pub. No.: WO2018/097693
PCT Pub. Date: May 31, 2018

(65) Prior Publication Data
US 2020/0267408 A1    Aug. 20, 2020

(30) Foreign Application Priority Data
Nov. 28, 2016   (KR) .................. 10-2016-0159717

(51) Int. Cl.
*H04N 19/513* (2014.01)
*H04N 19/105* (2014.01)
(Continued)

(52) U.S. Cl.
CPC ......... *H04N 19/521* (2014.11); *H04N 19/105* (2014.11); *H04N 19/139* (2014.11); *H04N 19/176* (2014.11); *H04N 19/537* (2014.11)

(58) Field of Classification Search
CPC .. H04N 19/521; H04N 19/105; H04N 19/139; H04N 19/176; H04N 19/537
See application file for complete search history.

(56) References Cited

U.S. PATENT DOCUMENTS 5,973,754 A * 10/1999 Panis .................. G06T 7/277
                                                  348/699
6,584,212 B1   6/2003 Park et al.
(Continued)

FOREIGN PATENT DOCUMENTS

EP         3 342 167 A1    7/2018
JP         2013-016934 A   1/2013
(Continued)

OTHER PUBLICATIONS

International Search Report dated May 1, 2018 in counterpart International Patent Application No. PCT/KR2017/013673 (3 pages in English and 3 pages in Korean).
(Continued)

*Primary Examiner* — Hesham K Abouzahra
(74) *Attorney, Agent, or Firm* — NSIP Law

(57) ABSTRACT

The present invention relates to a method for encoding and decoding an image. The method for decoding an image includes: deriving an initial motion vector from a merge candidate list of a current block; deriving a refined motion vector using the initial motion vector; and generating a
(Continued)

prediction block of the current block using the refined motion vector.

7 Claims, 16 Drawing Sheets

(51) Int. Cl.
*H04N 19/139* (2014.01)
*H04N 19/176* (2014.01)
*H04N 19/537* (2014.01)

(56) References Cited

U.S. PATENT DOCUMENTS

| | | | |
|---|---|---|---|
| 2003/0112872 | A1 | 6/2003 | Park et al. |
| 2013/0101040 | A1* | 4/2013 | Francois .............. H04N 19/176 375/240.16 |
| 2013/0114717 | A1* | 5/2013 | Zheng .................. H04N 19/52 375/240.14 |
| 2014/0205013 | A1* | 7/2014 | Kim ..................... H04N 19/176 375/240.16 |
| 2018/0041769 | A1* | 2/2018 | Chuang ................ H04N 19/573 |

FOREIGN PATENT DOCUMENTS

| | | |
|---|---|---|
| JP | 2018-512810 A | 5/2018 |
| JP | 2019-519998 A | 7/2019 |
| KR | 10-0772576 61 | 11/2007 |
| KR | 10-2012-0096471 A | 8/2012 |
| KR | 10-2013-0081676 A | 7/2013 |
| KR | 10-2013-0085013 A | 7/2013 |
| KR | 10-2014-0092876 A | 7/2014 |
| KR | 10-2014-0095607 A | 8/2014 |
| WO | WO 2011/047994 A1 | 4/2011 |
| WO | WO 2013/070757 A1 | 5/2013 |
| WO | WO 2016/160608 A1 | 10/2016 |

OTHER PUBLICATIONS

Jung, Joel et al., "Competition-Based Scheme for Motion Vector Selection and Coding", *ITU-Telecommunications Standardization Sector Study Group*, 16 Question 6, Video Coding Experts Group (VCEG), 29$^{th}$ Meeting: Klagenfurt, Austria, Jul. 17-18, 2006 (pp. 1-7).

Chen, Jianle et al., "Further improvements to HMKTA-1.0", *ITU-Telecommunications Standardization Sector Study Group*, 16 Question 6, Video Coding Experts Group (VCEG), 52$^{nd}$ Meeting: Jun. 19-26, 2015 Warsaw, Poland (pp. 1-8).

Fukushima, et al. "Merge based mvd transmission" *Joint Collaborative Team on Video Coding (JCT-VC) of ITU-T SG16 WP3 and ISO/IEC JTC1/SC29/WG11* 6$^{th}$Meeting: Torino, IT, Jul. 14-22, 2011. (11 pages in English).

Chen, et al. "Algorithm description of joint exploration test model 1." *Joint Video Exploration Team (JVET) of ITU-T SG* Oct. 16, 2016 (40 pages in English).

* cited by examiner

FIG. 9

| Merge candidate index (merge_idx) | L0 Motion information | | L1 Motion information | |
|---|---|---|---|---|
| | Motion vector | Reference picture index | Motion vector | Reference picture index |
| 0 | (3, 1) | 0 | (-2, 0) | 0 |
| 1 | (-1, 5) | 1 | (-3, 0) | 0 |
| 2 | (3, 1) | 0 | - | - |
| 3 | (3, 1) | 0 | (-3, 0) | 0 |
| 4 | (6, 2) | 0 | - | - |

FIG. 10

| Initial L0 motion vector list | |
|---|---|
| Motion vector | Reference picture index |
| (3, 1) | 0 |
| (-1, 5) | 1 |
| (6, 2) | 0 |

| Initial L1 motion vector list | |
|---|---|
| Motion vector | Reference picture index |
| (-2, 0) | 0 |
| (-3, 0) | 0 |

FIG. 11

| Merge candidate index (merge_idx) | L0 Motion information | | L1 Motion information | |
|---|---|---|---|---|
| | Motion vector | Reference picture index | Motion vector | Reference picture index |
| 0 | (3, 1) | 0 | (-2, 0) | 0 |
| 1 | (-1, 5) | 1 | (-3, 0) | 0 |
| 2 | (-3, -1) | 0 | - | - |
| 3 | (3, 1) | 0 | (-3, 0) | 0 |
| 4 | (6, 2) | 0 | - | - |

FIG. 14

| Merge candidate index (merge_idx) | L0 Motion information | | L1 Motion information | |
|---|---|---|---|---|
| | Motion vector | Reference picture index | Motion vector | Reference picture index |
| 0 | (3, 1) | 0 | (-2, 0) | 0 |
| 1 | (-1, 5) | 1 | (-3, 0) | 0 |
| 2 | (-3, -1) | 0 | - | - |
| 3 | (3, 1) | 0 | (-3, 0) | 0 |
| 4 | (6, 2) | 0 | - | - |

FIG. 15

| Merge candidate index (merge_idx) | L0 Motion information | | L1 Motion information | |
|---|---|---|---|---|
| | Motion vector | Reference picture index | Motion vector | Reference picture index |
| 0 | (3, 1) | 0 | - | - |
| 1 | (-1, 5) | 1 | - | - |
| 2 | (-3, -1) | 0 | - | - |
| 3 | (3, 1) | 0 | (-3, 0) | 0 |
| 4 | (6, 2) | 0 | - | - |

Position of neighbor sub-block usable as initial motion
vector of sub-block

IMAGE ENCODING/DECODING METHOD AND DEVICE, AND RECORDING MEDIUM HAVING BITSTREAM STORED THEREON

CROSS REFERENCE TO RELATED APPLICATIONS

This application is a U.S. National Stage Application of International Application No. PCT/KR2017/013673, filed on Nov. 28, 2017, which claims the benefit under 35 USC 119(a) and 365(b) of Korean Patent Application No. 10-2016-0159717, filed on Nov. 28, 2016, in the Korean Intellectual Property Office, the entire disclosure of which is incorporated herein by reference for all purposes.

TECHNICAL FIELD

The present invention relates to a method and apparatus for encoding/decoding an image and recording medium for storing a bitstream. More particularly, the present invention relates to a method and apparatus for encoding/decoding an image by refining a motion vector.

BACKGROUND ART

Recently, the demand for high-resolution quality images such as high definition (HD) images or ultra high definition (UHD) images has increased in various application fields. However, higher resolution and quality image data have increased data amounts in comparison with conventional image data. Therefore, when transmitting image data by using a medium such as conventional wired or wireless broadband networks or when storing image data in a conventional storage medium, transmission cost and storage cost increase. In order to solve these problems occurring with an improvement in resolution and quality of image data, high-efficiency image encoding/decoding techniques are required.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data can be effectively compressed by using such image compression technology, and the compressed image data is transmitted or stored.

DISCLOSURE

Technical Problem

An object of the present invention is to provide a method and apparatus for encoding/decoding an image, the method and apparatus refining a motion vector to enhance encoding/decoding efficiency of an image.

Technical Solution

According to the present invention, there is provided a method for decoding an image, the method including: deriving an initial motion vector from a merge candidate list of a current block; deriving a refined motion vector using the initial motion vector; and generating a prediction block of the current block using the refined motion vector.

In the method for decoding an image, at the deriving of the initial motion vector, the initial motion vector may be derived from a merge candidate indicated by merge index information.

In the method for decoding an image, at the deriving of the initial motion vector, when the current block is a block where bi-prediction is possible and motion information in only one prediction direction exists in the merge candidate indicated by the merge index information, a motion vector of the existing motion information may be mirrored or scaled to derive the initial motion vector in a prediction direction where the motion information is absent.

In the method for decoding an image, at the deriving of the refined motion vector, a motion vector indicating a template minimizing a difference with a neighbor template of the current block may be searched for in a search area of a reference picture indicated by the initial motion vector, and the motion vector indicating the template minimizing the difference may be derived as the refined motion vector.

In the method for decoding an image, the search area may be determined as an area centered on a pixel position of the reference picture indicated by the initial motion vector, the area having at least one of cross, square, diamond, and hexagon shapes.

In the method for decoding an image, the motion vector indicating the template minimizing the difference with the neighbor template of the current block in the search area of the reference picture indicated by the initial motion vector may be searched for based on at least one of a distortion value between templates and a cost value for the motion vector.

In the method for decoding an image, at the deriving of the refined motion vector, the refined motion vector may be derived based on at least one prediction block indicated by the initial motion vector.

In the method for decoding an image, at the deriving of the refined motion vector, when the current block is a bi-directional prediction block, a weighted sum of a first prediction block indicated by a first prediction direction initial motion vector and a second prediction block indicated by a second prediction direction initial motion vector may be set as a template and a search area of at least one reference picture indicated by at least one of the first prediction direction initial motion vector and the second prediction direction initial motion vector may be set, such that a motion vector indicating a third prediction block minimizing a difference with the template in the search area may be derived as the refined motion vector. Here, when a first search area indicated by the first prediction direction initial motion vector and a second search area indicated by the second prediction direction initial motion vector are set, the refined motion vector may be derived using motion vectors indicating prediction blocks minimizing the difference with the template in the first search area and the second search area.

In the method for decoding an image, when the first prediction direction initial motion vector or the second prediction direction initial motion vector is absent, an existing initial motion vector may be mirrored or scaled to derive a non-existing initial motion vector.

In the method for decoding an image, the current block may be a sub-block of a decoding target block.

According to the present invention, there is provided a method for encoding an image, the method including: deriving an initial motion vector from a merge candidate list of a current block; deriving a refined motion vector using the initial motion vector; and generating a prediction block of the current block using the refined motion vector.

In the method for encoding an image, at the deriving of the initial motion vector, the initial motion vector may be derived from a merge candidate indicated by merge index information.

In the method for encoding an image, at the deriving of the initial motion vector, when the current block is a block where bi-prediction is possible and motion information in only one prediction direction exists in the merge candidate indicated by the merge index information, a motion vector of the existing motion information may be mirrored or scaled to derive the initial motion vector in a prediction direction where the motion information is absent.

In the method for encoding an image, at the deriving of the refined motion vector, a motion vector indicating a template minimizing a difference with a neighbor template of the current block may be searched for in a search area of a reference picture indicated by the initial motion vector, and the motion vector indicating the template minimizing the difference may be derived as the refined motion vector.

In the method for encoding an image, the search area may be determined as an area centered on a pixel position of the reference picture indicated by the initial motion vector, the area having at least one of cross, square, diamond, and hexagon shapes.

In the method for encoding an image, the motion vector indicating the template minimizing the difference with the neighbor template of the current block in the search area of the reference picture indicated by the initial motion vector may be searched for based on at least one of a distortion value between templates and a cost value for the motion vector.

In the method for encoding an image, at the deriving of the refined motion vector, the refined motion vector may be derived based on at least one prediction block indicated by the initial motion vector.

In the method for encoding an image, at the deriving of the refined motion vector, when the current block is a bi-directional prediction block, a weighted sum of a first prediction block indicated by a first prediction direction initial motion vector and a second prediction block indicated by a second prediction direction initial motion vector may be set as a template and a search area of a reference picture indicated by the first prediction direction initial motion vector or the second prediction direction initial motion vector may be set, such that a motion vector indicating a third prediction block minimizing a difference with the template in the search area may be derived as the refined motion vector.

In the method for encoding an image, when the first prediction direction initial motion vector or the second prediction direction initial motion vector is absent, an existing initial motion vector may be mirrored or scaled to derive a non-existing initial motion vector.

In the method for encoding an image, the current block may be a sub-block of a encoding target block.

According to the present invention, a recording medium stores a bitstream formed by a method for decoding an image, the method including: deriving an initial motion vector from a merge candidate list of a current block; deriving a refined motion vector using the initial motion vector; and generating a prediction block of the current block using the refined motion vector.

Advantageous Effects

According to the present invention, a method and apparatus for encoding/decoding an image can be provided with enhanced compression efficiency.

According to the present invention, encoding and decoding efficiency of an image can be enhanced.

According to the present invention, computational complexity of the encoder and decoder for an image can be reduced.

DESCRIPTION OF DRAWINGS

FIGS. 9 and 10 are views illustrating configurations of an initial motion vector list.

FIG. 11 is a view illustrating a method of deriving an initial motion vector using merge index information.

FIG. 14 is a view illustrating an example of deriving an additional motion vector when only one motion vector corresponding to an L0 or L1 list exists in a block where bi-prediction can be performed.

FIG. 15 is a view illustrating an example of selecting a merge candidate having bi-directional motion information in a block where bi-prediction can be performed as an initial motion vector.

MODE FOR INVENTION

Figure 1:
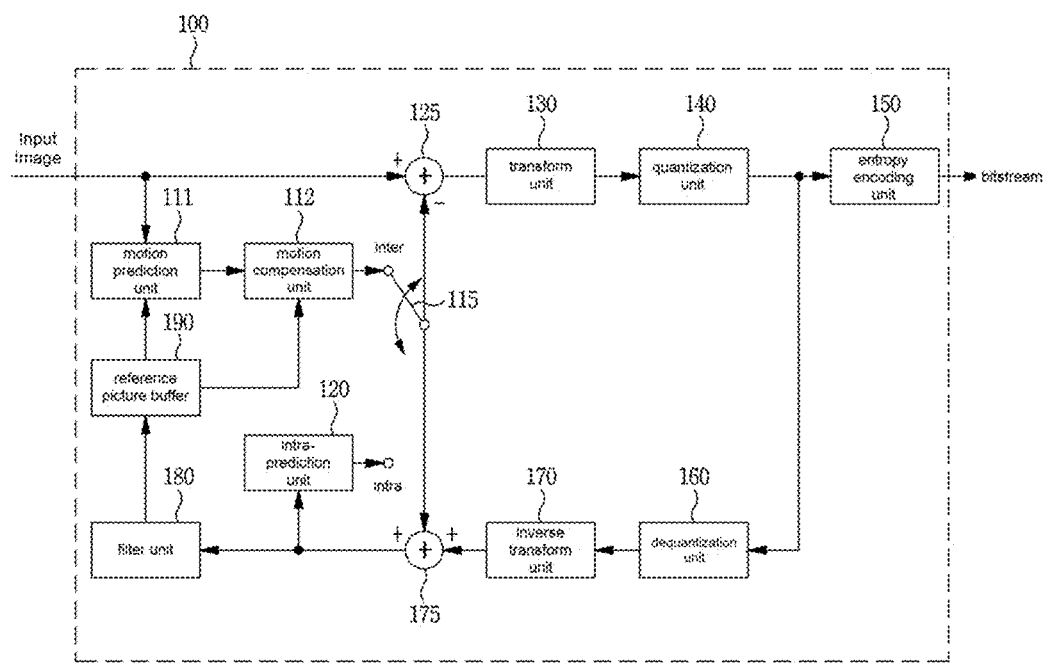
FIG. 1 is a block diagram illustrating configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Description of terms

Encoder: means an apparatus performing encoding.

Decoder: means an apparatus performing decoding

Block: is an M×N array of a sample. Herein, M and N mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel.

Unit: refers to an encoding and decoding unit. When encoding and decoding an image, the unit may be a region generated by partitioning a single image. In addition, the unit may mean a subdivided unit when a single image is partitioned into subdivided units during encoding or decoding. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block, a prediction unit, a prediction block, a residual unit, a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method and a binary-tree partitioning method to configure a lower unit such as coding unit, prediction unit, transform unit, etc. It may be used as a term for designating a pixel block that becomes a process unit when encoding/decoding an image as an input image.

Coding Tree Block: may be used as a term for designating any one of a Y coding tree block, Cb coding tree block, and Cr coding tree block.

Neighbor Block: means a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: means a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at the same position as the current block of the current picture within a reference picture, or a neighbor block thereof.

Unit Depth: means a partitioned degree of a unit. In a tree structure, a root node may be the highest node, and a leaf node may be the lowest node. In addition, when a unit is expressed as a tree structure, a level in which a unit is present may mean a unit depth.

Bitstream: means a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Unit: means a basic unit when performing prediction such as inter-prediction, intra-prediction, inter-compensation, intra-compensation, and motion compensation. A single prediction unit may be partitioned into a plurality of partitions with a small size, or may be partitioned into a lower prediction unit.

Prediction Unit Partition: means a form obtained by partitioning a prediction unit.

Reference Picture List: means a list including one or more reference pictures used for inter-picture prediction or motion compensation. LC (List Combined), L0 (List 0), L (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Reference Picture Index: means an index indicating a specific reference picture in a reference picture list.

Reference Picture: may mean a picture to which a specific block refers for inter-picture prediction or motion compensation.

Motion Vector: is a two-dimensional vector used for inter-picture prediction or motion compensation and may mean an offset between a reference picture and an encoding/decoding target picture. For example, (mvX, mvY) may represent a motion vector, mvX may represent a horizontal component, and mvY may represent a vertical component.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list of motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: means a list composed of merge candidates.

Merge Candidate: means a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: means information indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: means a basic unit used when encoding or decoding a residual signal, for example, when performing transform, reverse transform, quantization, dequantization, or transform coefficient encoding/decoding. One transform unit may be partitioned into a plurality of smaller transform units.

Scaling: means a process of multiplying a transform coefficient level by a factor. A transform coefficient may be generated by scaling a transform coefficient level. The scaling also may be referred to as dequantization.

Quantization Parameter: may mean a value used when generating a transform coefficient level of a transform coefficient during quantization. The quantization parameter also may mean a value used when generating a transform coefficient by scaling a transform coefficient level during dequantization. The quantization parameter may be a value mapped on a quantization step size.

Delta Quantization Parameter: means a difference value between a predicted quantization parameter and a quantization parameter of an encoding/decoding target unit.

Scan: means a method of sequencing coefficients within a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: means a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: means a transform coefficient having a value other than zero, or a transform coefficient level having a value other than zero.

Quantization Matrix: means a matrix used in a quantization process or a dequantization process performed to improve subjective or objective image quality. The quantization matrix also may be referred to as a scaling list.

Quantization Matrix Coefficient: means each element within a quantization matrix. The quantization matrix coefficient also may be referred to as a matrix coefficient.

Default Matrix: means a predetermined quantization matrix preliminarily defined in an encoder or a decoder.

Non-default Matrix: means a quantization matrix that is not preliminarily defined in an encoder or a decoder but is signaled by a user.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a pixel value of a block that has been already encoded/decoded and is adjacent to a current block as a reference pixel. The intra-prediction unit 120 may perform spatial prediction by using a reference pixel, or generate prediction samples of an input block by performing spatial prediction. Herein, the intra prediction may mean intra-prediction.

When a prediction mode is an inter mode, the motion prediction unit 111 may retrieve a region that best matches with an input block from a reference image when performing motion prediction, and deduce a motion vector by using the retrieved region. The reference image may be stored in the reference picture buffer 190.

The motion compensation unit 112 may generate a prediction block by performing motion compensation using a motion vector. Herein, inter-prediction may mean inter-prediction or motion compensation.

The motion prediction unit 111 and the motion compensation unit 112 can generate a prediction block by applying an interpolation filter to a partial region of the reference image when the motion vector value does not have an integer value. A motion prediction and motion compensation method of a prediction unit included in a coding unit based on an encoding unit for performing prediction or motion compensation includes a skip mode (Skip Mode), a merge mode, an advanced motion vector prediction (AMVP) Mode and the current picture reference mode, and it is possible to perform inter picture prediction or motion compensation according to each mode.

The subtractor 125 may generate a residual block by using a residual between an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a quantization parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of pixel information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level, the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), an intra-prediction mode/direction, a reference sample filtering method, a prediction block filtering method, a prediction block filter tap, a prediction block filter coefficient, an inter-prediction mode, motion information, a motion vector, a reference picture index, a inter-prediction angle, an inter-prediction indicator, a reference picture list, a reference picture, a motion vector predictor candidate, a motion vector candidate list, whether to use a merge mode, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag(CBF), a quantization parameter, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive in-loop filter, an adaptive in-loop filter coefficient, an adaptive in-loop filter tab, an adaptive in-loop filter shape/form, a binarization/inverse-binarization method, a context model determining method, a context model updating method, whether to perform a regular mode, whether to perform a bypass mode, a context bin, a bypass bin, a transform coefficient, a transform coefficient level, a transform coefficient level scanning method, an image displaying/outputting sequence, slice identification information, a slice type, slice partition information, tile identification information, a tile type, tile partition information, a picture type, a bit depth, and information of a luma signal or chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to the reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based pixels included in several rows or columns which are included in the block. When a deblocking filter is applied to a block, another filter may be applied according to a required deblocking filtering strength.

In order to compensate an encoding error, a proper offset value may be added to a pixel value by using a sample adaptive offset. The sample adaptive offset may correct an offset of a deblocked image from an original image by a pixel unit. A method of partitioning pixels of an image into a predetermined number of regions, determining a region to which an offset is applied, and applying the offset to the determined region, or a method of applying an offset in consideration of edge information on each pixel may be used.

The adaptive loop filter may perform filtering based on a comparison result of the filtered reconstructed image and the original image. Pixels included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

Figure 2:
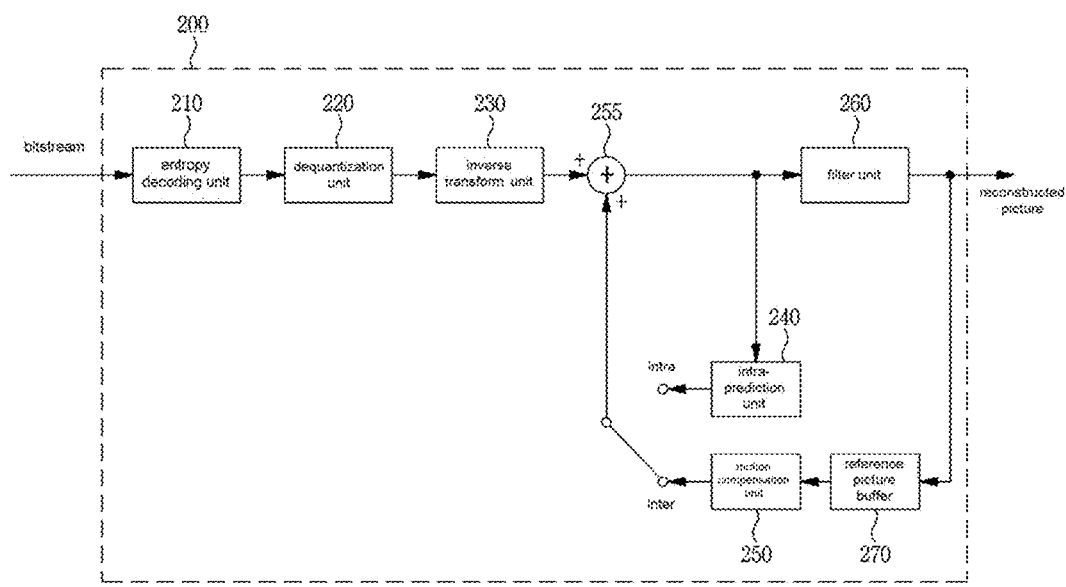
FIG. 2 is a block diagram illustrating configurations of a decoding apparatus according to an embodiment of the present invention.

The reconstructed block or the reconstructed image having passed through the filter unit 180 may be stored in the reference picture buffer 190. FIG. 2 is a block diagram showing a configuration of a decoding apparatus according to an embodiment to which the present invention is applied.

A decoding apparatus 200 may be a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 255, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level, the entropy decoding unit 210 may change a one-dimensional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing spatial prediction that uses a pixel value of a block adjacent to a decoding target block and which has been already decoded.

When an inter mode is used, the motion compensation unit 250 may generate a prediction block by performing motion compensation that uses a motion vector and a reference image stored in the reference picture buffer 270.

The adder 255 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction.

Figure 3:
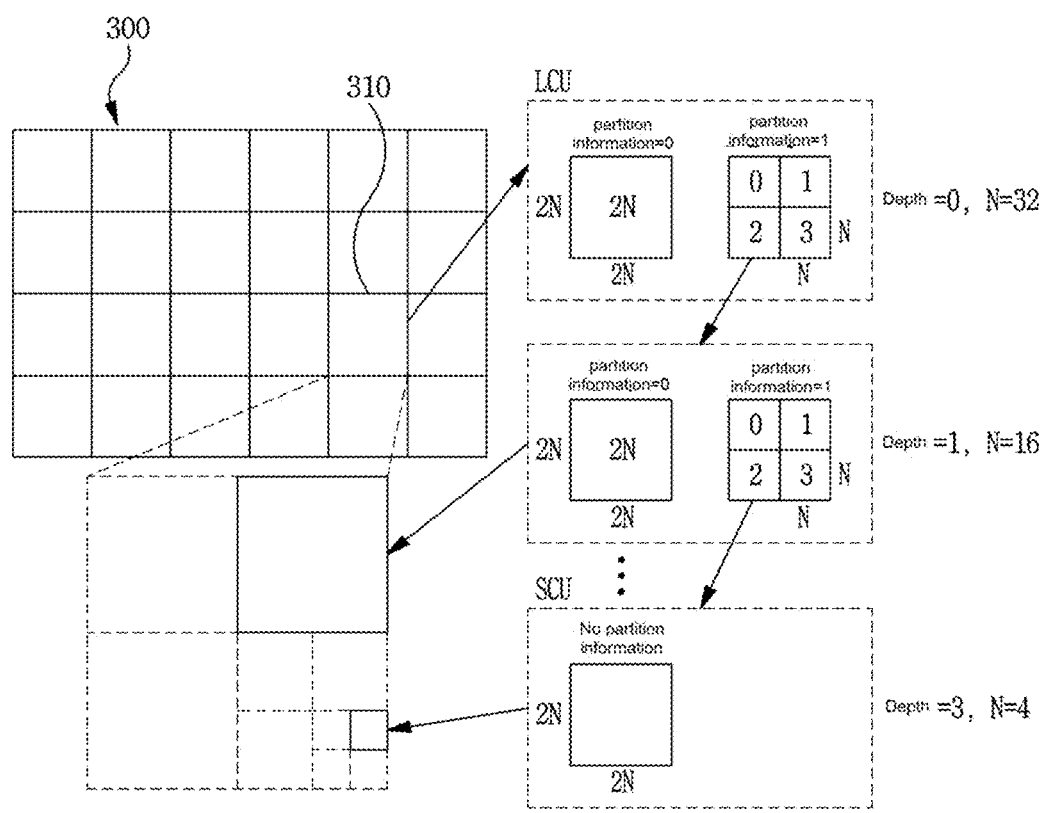
FIG. 3 is a view schematically illustrating a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra mode and an inter mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned in a layer associated with depth information based on a tree structure. Each of partitioned lower unit may have depth information. Depth information may be information representing a size of a CU, and may be stored in each CU.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. When a single coding unit is partitioned into two coding units, it may be called that the coding unit is partitioned in a binary-tree form. An LCU 310 of FIG. 3 is an example of an LCU to which both of partitioning of a quad-tree form and partitioning of a binary-tree form are applied.

Figure 4:
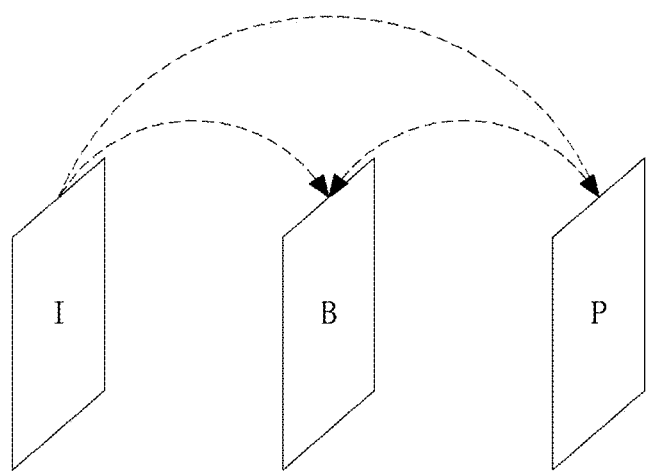
FIG. 4 is a view illustrating an embodiment of an inter prediction process.

FIG. 4 is a diagram illustrating an embodiment of an inter-picture prediction process.

Figure 5:
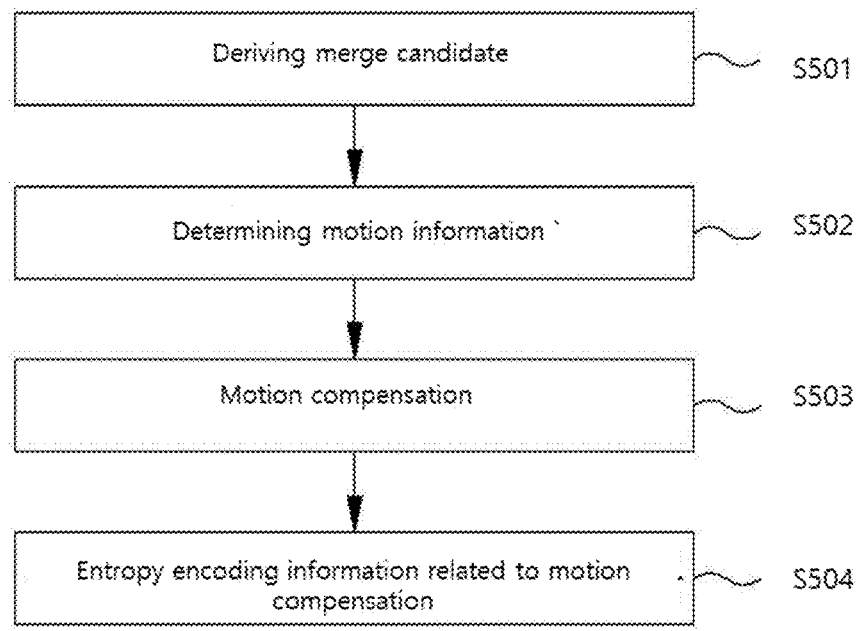
FIG. 5 is a flowchart illustrating a method for encoding an image according to an embodiment of the present invention.

In FIG. 4, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are present in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Based on the above, a method for encoding/decoding an image according to the present invention will be described in detail.

Figure 6:
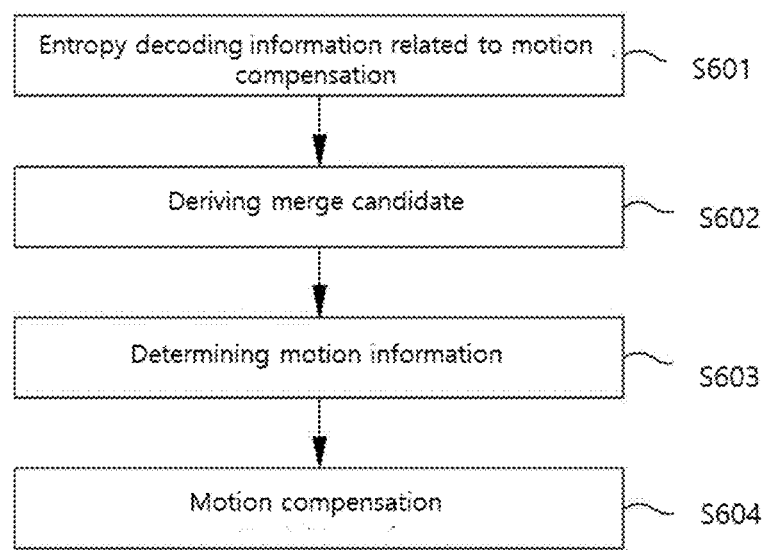
FIG. 6 is a flowchart illustrating a method for decoding an image according to an embodiment of the present invention.

FIG. 5 is a flowchart illustrating a method for encoding an image according to an embodiment of the present invention. FIG. 6 is a flowchart illustrating a method for decoding an image according to an embodiment of the present invention.

Referring to FIG. 5, the encoding apparatus may derive merge candidates at step S501, and may generate a merge candidate list based on the derived merge candidates. When the merge candidate list is generated, motion information may be determined using the generated merge candidate list at step S502, and motion compensation of the current block may be performed using the determined motion information at step S503. Next, the encoding apparatus may perform entropy encoding on information about motion compensation at step S504.

Referring to FIG. 6, the decoding apparatus may perform entropy decoding on the information about motion compensation received from the encoding apparatus at step S601, may derive the merge candidates at step S602, and may generate the merge candidate list based on the derived merge candidates. When the merge candidate list is generated, motion information of the current block may be determined using the generated merge candidate list at step S603. Next, the decoding apparatus may perform motion compensation using motion information at step S604.

Here, FIGS. 5 and 6 show examples to which the merge mode described in FIG. 4 is applied.

Hereinafter, the steps shown in FIGS. 5 and 6 will be described in detail.

First, the deriving of the merge candidates S501 and S602 will be described in detail).

The merge candidate for the current block may include at least one of a spatial merge candidate, a temporal merge candidate, and an additional merge candidate. Here, deriving of the spatial merge candidate may mean deriving the spatial merge candidate and adding the spatial merge candidate to the merge candidate list.

Figure 7:
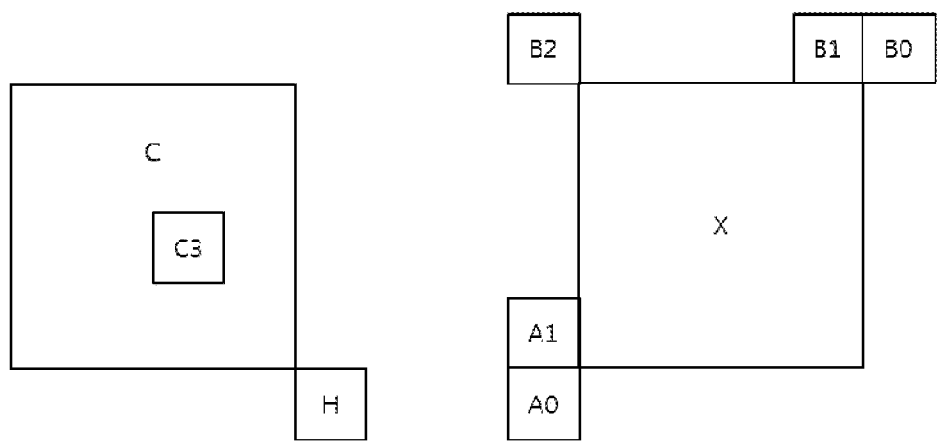
FIG. 7 is a view illustrating an example of deriving a spatial merge candidate and a temporal merge candidate of a current block.

FIG. 7 is a view illustrating an example of deriving a spatial merge candidate and a temporal merge candidate of a current block.

Referring to FIG. 7, the spatial merge candidate of the current block may be derived from neighboring blocks adjacent to a current block X. The neighboring blocks adjacent to the current block may include at least one of a block B1 adjacent to the top of the current block, a block A1 adjacent to the left of the current block, a block B0 adjacent to the upper right corner of the current block, a block B2 adjacent to the upper left corner of the current block, and a block A0 adjacent to the lower left corner of the current block.

In order to derive the spatial merge candidate of the current block, whether or not the neighbor block adjacent to the current block can be used in deriving the spatial merge candidate of the current block may be determined. Here, whether or not the neighbor block adjacent to the current block can be used in deriving the spatial merge candidate of the current block may be determined according to predetermined priorities. For example, in the example shown in FIG. 7, availability of deriving the spatial merge candidate may be determined in the order of blocks at the locations A1, B1, B0, A0, and B2. The spatial merge candidates determined based on the order for determining availability may be added to the merge candidate list of the current block in sequence.

For example, when four spatial merge candidates are derived from neighbor blocks at the locations A1, B0, A0, and B2, the derived spatial merge candidates may be added to the merge candidate list in order.

Also, the spatial merge candidates may be derived based on at least one of coding parameters.

Here, motion information of the spatial merge candidates may include at least three pieces of motion information, such as motion information of the L0, L1, L2, L3, etc. Here, the reference picture list may include at least one of L0, L1, L2, L3, etc.

Next, a method of deriving the temporal merge candidate of the current block will be described.

The temporal merge candidate of the current block may be derived from a reconstructed block included in a collocated picture of the current picture. Here, the collocated picture is a picture where encoding/decoding is completed before the current picture, and may be a picture having a temporal order different from that of the current picture.

Deriving of the temporal merge candidate may mean deriving the temporal merge candidate and adding the temporal merge candidate to the merge candidate list.

Referring to FIG. 7, in the collocated picture of the current picture, a temporal merge candidate of the current block may be derived from a block including an outer location of a block corresponding to spatially the same location as a current block X or from a block including an inner location of a block corresponding to spatially the same location as the current block X. Here, the temporal merge candidate may mean motion information of a collocated block. For example, the temporal merge candidate of the current block X may be derived from a block H adjacent to the lower right corner of a block C corresponding to spatially the same location as the current block or from a block C3 including the central point of the block C. The block H or block C3, etc. used to derive the temporal merge candidate of the current block may be referred to as 'a collocated block'.

When the temporal merge candidate of the current block can be derived from a block H including an outer location of the block C, the block H may be set as a collocated block of the current block. In this case, the temporal merge candidate of the current block may be derived based on motion information of the block H. In contrast, when the temporal merge candidate of the current block cannot be derived from the block H, the block C3 including an inner location of the block C may be set as a collocated block of the current block. In this case, the temporal merge candidate of the current block may be derived based on motion information of the block C3. When the spatial merge candidate of the current block cannot be derived from the block H and the block C3 (for example, when the block H and the block C3 are intra encoded), the temporal merge candidate for the current block may not be derived or may be derived from a block having different location from the block H and the block C3.

As another example, the temporal merge candidate of the current block may be derived from multiple blocks in a collocated picture. For example, multiple temporal merge candidates for the current block may be derived from the block H and the block C3.

When the distance between the current picture in which the current block is included and the reference picture of the current block is different from the distance between the collocated picture in which the collocated block is included and the reference picture of the collocated block, a motion vector of the temporal merge candidate of the current block may be obtained by scaling a motion vector of the collocated block. Here, scaling may be performed based on at least one of the distance between the current picture and the reference picture referenced by the current block, and the distance between the collocated picture and the reference picture referenced by the collocated block. For example, according to the ratio of the distance between the current picture and the reference picture referenced by the current block and the distance between the collocated picture and the reference picture referenced by the collocated block, the motion vector of the collocated block is scaled, thereby deriving the motion vector of the temporal merge candidate of the current block.

Also, at least one of the temporal merge candidate, the collocated picture, the collocated block, the prediction list utilization flag, and the reference picture index may be derived based on at least one of coding parameters of the current block, the neighbor block, and the collocated block.

At least one of the spatial merge candidates and the temporal merge candidates is derived, and then the derived merge candidate is added to the merge candidate list according to the derived order, whereby the merge candidate list can be generated.

Next, a method of deriving an additional merge candidate of the current block will be described.

The additional merge candidate may mean at least one of a modified spatial merge candidate, a modified temporal merge candidate, a combined merge candidate, and a merge candidate having a predetermined motion information value. Here, the deriving of the additional merge candidate may mean deriving the additional merge candidate and adding the additional merge candidate to the merge candidate list.

The modified spatial merge candidate may mean a merge candidate in which at least one piece of motion information of the derived spatial merge candidate is modified.

The modified temporal merge candidate may mean a merge candidate in which at least one piece of motion information of the derived temporal merge candidate is modified.

The combined merge candidate may mean a merge candidate derived by combining at least one piece of motion information among motion information of the spatial merge candidate, the temporal merge candidate, the modified spatial merge candidate, the modified temporal merge candidate, the combined merge candidate, and the merge candidates having the predetermined motion information value that exist in the merge candidate list.

Alternatively, the combined merge candidate may mean a merge candidate derived by combining at least one piece of motion information of a spatial merge candidate, a temporal merge candidate, a modified spatial merge candidate, a modified temporal merge candidate, a combined merge candidate, and a merge candidate having a predetermined motion information value. The spatial merge candidate and the temporal merge candidate are derived from a block that does not exist in the merge candidate list but can be used to derive at least one of the spatial merge candidate and the temporal merge candidate. The modified spatial merge candidate and the modified temporal merge candidate are generated based on the spatial merge candidate and the temporal merge candidate.

Alternatively, the combined merge candidate may be derived using entropy-decoded motion information from the bitstream in the decoder. Here, motion information used in deriving the combined merge candidate in the encoder may be entropy encoded in the bitstream.

The combined merge candidate may mean a combined bi-prediction merge candidate. The combined bi-prediction merge candidate is a merge candidate using bi-prediction, and may mean a merge candidate having L0 motion information and L1 motion information.

A merge candidate having a predetermined motion information value may mean a zero merge candidate having a motion vector of (0, 0). In the meantime, the merge candidate having the predetermined motion information value may be set to have the same value in the encoding apparatus and the decoding apparatus.

At least one of the modified spatial merge candidate, the modified temporal merge candidate, the combined merge candidate, and the merge candidate having the predetermined motion information value may be derived or generated based on at least one of coding parameters of the current block, the neighbor block, or the collocated block. Also, at least one of the modified spatial merge candidate, the modified temporal merge candidate, the combined merge candidate, and the merge candidate having the predetermined motion information value may be added to the merge candidate list based on at least one coding parameters of the current block, the neighbor block, or the collocated block.

In the meantime, the size of the merge candidate list may be determined based on the coding parameter of the current block, the neighbor block, or the collocated block, and may differ depending on the coding parameter.

In the meantime, in the present invention, a refined motion vector derived using a motion vector refining method may be used in deriving the merge candidate. Detailed description thereof will be described later with reference to FIGS. 7 to 28.

Next, the determining of motion information of the current block by using the generated merge candidate list at steps S502 and S603 will be described in detail.

The encoder may determine a merge candidate being used in motion compensation among merge candidates in the merge candidate list through motion estimation, and may encode a merge candidate index (merge_idx) indicating the determined merge candidate in a bitstream.

In the meantime, in order to generate the prediction block, the encoder may select a merge candidate from the merge candidate list based on the merge candidate index to determine motion information of the current block. Here, the prediction block of the current block may be generated by performing motion compensation based on the determined motion information.

The decoder may decode the merge candidate index in the bitstream to determine a merge candidate of the merge candidate list indicated by the merge candidate index. The determined merge candidate may be determined as motion information of the current block. The determined motion information may be used in motion compensation of the current block. Here, motion compensation may mean inter prediction.

Next, the performing of motion compensation using the determined motion information at steps S503 and S604 will be described.

The encoding apparatus and the decoding apparatus may perform inter prediction or motion compensation using the determined motion information at step S503 and S604. Here, the current block may contain motion information of the determined merge candidate.

The current block may have at least one motion vector up to at most N motion vectors depending on a prediction direction. At least one prediction block up to at most N prediction blocks may be generated using the motion vector to derive a final prediction block of the current block.

For example, when the current block has one motion vector, the prediction block generated using the motion vector (or motion information) may be determined as the final prediction block of the current block.

In contrast, when the current block has multiple motion vectors (or motion information), multiple prediction blocks may be generated using multiple motion vectors (or motion information), and the final prediction block of the current block may be determined based on a weighted sum of the multiple prediction blocks. Reference pictures including multiple prediction blocks indicated by multiple motion vectors (or motion information) may be included in different reference picture lists, and may be included in the same reference picture list.

For example, a plurality of prediction blocks may be generated based on at least one of a spatial motion vector candidate, a temporal motion vector candidate, a motion vector having a predetermined value, and a combined motion vector candidate. The final prediction block of the current block may be determined based on the weighted sum of the plurality of prediction blocks.

As another example, a plurality of prediction blocks may be generated based on motion vector candidates indicated by a preset motion vector candidate index. The final prediction block of the current block may be determined based on the weighted sum of the plurality of prediction blocks. Also, a plurality of prediction blocks may be generated based on motion vector candidates that exist in a preset motion vector candidate index range. The final prediction block of the current block may be determined based on the weighted sum of the plurality of prediction blocks.

A weighting factor being applied to each prediction block may have the same value by 1/N (here, N is the number of generated prediction blocks). For example, when two prediction blocks are generated, a weighting factor being applied to each prediction block may be ½. When three prediction blocks are generated, a weighting factor being applied to each prediction block may be ⅓. When four prediction blocks are generated, a weighting factor being applied to each prediction block may be ¼. Alternatively, the final prediction block of the current block may be determined by assigning different weighting factors to respective prediction blocks.

The weighting factor does not have to have a fixed value for each prediction block, and may have a variable value for each prediction block. Here, the weighting factors being applied to respective prediction blocks may be the same, or may be different. For example, when two prediction blocks are generated, weighting factors being applied to the two prediction blocks may be a variable value for each block such as (½, ½), (⅓, ⅔), (¼, ¾), (⅖, ⅗), (⅜, ⅝), etc. In the meantime, the weighting factor may be a positive real number and a negative real number. For example, the weighting factor may be a negative real number such as (−½, 3/2), (−⅓, 4/3), (−¼, 5/4), etc.

In the meantime, in order to apply a variable weighting factor, one or more pieces of weighting factor information for the current block may be signaled through a bitstream. The weighting factor information may be signaled for each prediction block, and may be signaled for each reference picture. Multiple prediction blocks may share one piece of weighting factor information.

The encoding apparatus and the decoding apparatus may determine whether or not the predicted motion vector (or motion information) is used based on a prediction block list utilization flag. For example, when the prediction block list utilization flag indicates one, which is the first value, for each reference picture list, it may indicate that the encoding apparatus and the decoding apparatus can use the predicted motion vector of the current block to perform inter prediction or motion compensation. When the prediction block list utilization flag indicates zero which is the second value, it may indicate that the encoding apparatus and the decoding apparatus do not perform inter prediction or motion compensation by using the predicted motion vector of the current block. In the meantime, the first value of the prediction block list utilization flag may be set to zero, and the second value thereof may be set to one. Formulas 1 to 3 described below indicate an example of generating a final prediction block of the current block when inter-prediction indicators of the current block are PRED_BI, PRED_TRI, and PRED_QUAD and a prediction direction for each reference picture list is uni-directional.

$$P\_BI=(WF\_L0*P\_L0+OFFSET\_L0+WF\_L1*P\_L1+OFFSET\_L1+RF)>>1 \quad \text{[Formula 1]}$$

$$P\_TRI=(WF\_L0*P\_L0+OFFSET\_L0+WF\_L1*P\_L1+OFFSET\_L1+WF\_L2*P\_L2+OFFSET\_L2+RF)/3 \quad \text{[Formula 2]}$$

$$P\_QUAD=(WF\_L0*P\_L0+OFFSET\_L0+WF\_L1*P\_L1+OFFSET\_L1+WF\_L2*P\_L2+OFFSET\_L2+WF\_L3*P\_L3+OFFSET\_L3+RF)>>2 \quad \text{[Formula 3]}$$

In formulas 1 to 3, P_BI, P_TRI, and P_QUAD may indicate the final prediction block of the current block, and LX (X=0, 1, 2, 3) may mean a reference picture list. WF_LX may indicate a weighting factor value of a prediction block generated by using the LX, and OFFSET_LX may indicate an offset value for the prediction block generated by using the LX. P_LX may mean a prediction block generated by using a motion vector (or motion information) for the LX of the current block. RF may mean a rounding factor that may be set to zero, a positive number, or a negative number. The LX reference picture list may include at least one of a long-term reference picture, a reference picture on which deblocking filter is not performed, a reference picture on which sample adaptive offset is not performed, a reference picture on which adaptive loop filter is not performed, a reference picture on which deblocking filter and adaptive offset are performed, a reference picture on which deblocking filter and adaptive loop filter is performed, a reference picture on which sample adaptive offset and adaptive loop filter are performed, and a reference picture on which deblocking filter, sample adaptive offset, and adaptive loop filter are performed. In this case, the LX reference picture list may be at least one of an L2 reference picture list and an L3 reference picture list.

Even when the prediction direction for the predetermined reference picture list is a plurality of directions, the final prediction block for the current block may be obtained based on a weighted sum of prediction blocks. Here, weighting factors being applied to prediction blocks derived from the same reference picture list may have the same values, or may have different values.

At least one of a weighting factor (WF_LX) and an offset (OFFSET_LX) for multiple prediction blocks may be a coding parameter being entropy encoded/decoded. As another example, the weighting factor and the offset may be derived from an encoded/decoded neighboring block adjacent to the current block. Here, the neighboring block adjacent to the current block may include at least one of a block used for deriving the spatial motion vector candidate of the current block or a block used for deriving the temporal motion vector candidate of the current block.

As another example, the weighting factor and the offset may be determined based on a display order of a current picture and reference pictures (POC). In this case, when the current picture is far from the reference picture, the weighting factor or the offset may be set to a small value. When the current picture is close to the reference picture, the weighting factor or the offset may be set to a large value. For example, when a POC difference between the current picture and an L0 reference picture is 2, a weighting factor value being applied to a prediction block generated by referring to the L0 reference picture may be set to ⅓. In contrast, when a POC difference between the current picture and the L0 reference picture is 1, a weighting factor value being applied to a prediction block generated by referring to the L0 reference picture may be set to ⅔. As described above, the weighting factor or offset value may have an inverse relation with the display order difference between the current picture and the reference picture. As another example, the weighting factor or offset value may have a proportional relation with the display order difference between the current picture and the reference picture.

As another example, based on at least one of coding parameters, at least one of the weighting factor or the offset may be entropy encoded/decoded. Also, based on at least one of coding parameters, a weighted sum of prediction blocks may be calculated.

The weighted sum of a plurality of prediction blocks may be applied to only a partial area in the prediction block. Here, the partial area may be an area corresponding to the boundary in the prediction block. As described above, in order to apply the weighted sum to only the partial area, the weighted sum may be applied for each sub-block of the prediction block.

In sub-blocks having a smaller block size within a block having a block size indicated by area information, inter prediction or motion compensation may be performed using the same prediction block or the same final prediction block.

Also, in sub-blocks having a deeper block depth within a block having a block depth indicated by the area information, inter prediction or motion compensation may be performed using the same prediction block or the same final prediction block.

Also, when calculating a weighted sum of prediction blocks by using motion vector prediction, the weighted sum may be calculated using at least one motion vector candidate existing in the motion vector candidate list, and may be used as the final prediction block of the current block.

For example, the weighted sum of prediction blocks generated by using the spatial motion vector candidates may be calculated, and the calculated weighted sum may be used as the final prediction block of the current block.

For example, the weighted sum of prediction blocks generated by using the spatial motion vector candidates and the temporal motion vector candidates may be calculated, and the calculated weighted sum may be used as the final prediction block of the current block.

For example, the weighted sum of prediction blocks generated by using the combined motion vector candidates may be calculated, and the calculated weighted sum may be used as the final prediction block of the current block.

For example, the weighted sum of prediction blocks generated by using motion vector candidates having particular motion vector candidate indexes may be calculated, and the calculated weighted sum may be used as the final prediction block of the current block.

For example, the weighted sum of prediction blocks generated by using motion vector candidates existing in a particular motion vector candidate index range may be calculated, and the calculated weighted sum may be used as the final prediction block of the current block.

Also, when calculating a weighted sum of prediction blocks by using a merge mode, the weighted sum may be calculated using at least one merge candidate existing in the merge candidate list, and the calculated weighted sum may be used as the final prediction block of the current block.

For example, the weighted sum of prediction blocks generated by using the spatial merge candidates may be calculated, and the calculated weighted sum may be used as the final prediction block of the current block.

For example, the weighted sum of prediction blocks generated by using the spatial merge candidates and the temporal merge candidates may be calculated, and the calculated weighted sum may be used as the final prediction block of the current block.

For example, the weighted sum of prediction blocks generated by using the combined merge candidates may be calculated, and the calculated weighted sum may be used as the final prediction block of the current block.

For example, the weighted sum of prediction blocks generated by using merge candidates having particular merge candidate indexes may be calculated, and the calculated weighted sum may be used as the final prediction block of the current block.

For example, the weighted sum of prediction blocks generated by using merge candidates existing in a particular merge candidate index range may be calculated, and the calculated weighted sum may be used as the final prediction block of the current block.

In the encoder and the decoder, motion compensation may be performed using the motion vector/information of the current block. Here, the final prediction block, which is the result of motion compensation, may be generated using at least one prediction block. Here, the current block may mean at least one of a current coding block and a current prediction block.

Next, a process of entropy encoding/decoding information about motion compensation S504 and S601 will be disclosed in detail.

The encoding apparatus may entropy encode the information about motion compensation through a bitstream, and the decoding apparatus may entropy decode the information about motion compensation included in the bitstream. Here, the information about motion compensation being entropy encoded/decoded may include at least one of an inter-prediction indicator (inter_pred_idc), a reference picture index (ref_idx_l0, ref_idx_l1, ref_idx_l2, ref_idx_l3), a motion vector candidate index (mvp_l0_idx, mvp_l 1_idx, mvp_l2_idx, mvp_l3_idx), a motion vector difference, information on whether or not a skip mode is used (cu_skip_flag), information on whether or not a merge mode is used (merge_flag), merge index information (merge_index), information on whether or not merge mode-based motion vector refining is used (fruc_flag), a weighting factor value (wf_l0, wf_l1, wf_l2, wf_l3), and an offset value (offset_l0, offset_l1, offset_l2, offset_l3).

The inter-prediction indicator may mean inter-prediction direction or the number of prediction directions of the current block when the current block is encoded/decoded through inter prediction. For example, the inter-prediction indicator may indicate uni-directional prediction, or multi-directional prediction such as bi-directional prediction, tri-directional prediction, or quad-directional prediction, etc. The inter-prediction indicator may mean the number of reference pictures that are used when the current block generates the prediction block. Alternatively, one reference picture may be used for multi-directional prediction. In this case, M reference pictures are used to perform N-directional prediction (N>M). The inter-prediction indicator may mean the number of prediction blocks that are used when performing inter prediction or motion compensation for the current block.

A reference picture indicator may indicate a uni-direction (PRED_LX), a bi-direction (PRED_BI), a tri-direction (PRED_TRI), a quad-direction (PRED_QUAD), or greater direction depending on the number of prediction directions of the current block.

A prediction list utilization flag indicates whether or not the prediction block is generated by using the reference picture list.

The reference picture index may specify a reference picture being referenced by the current block in each reference picture list. At least one reference picture index may be entropy encoded/decoded for each reference picture list. Motion compensation may be performed on the current block by using at least one reference picture index.

The motion vector candidate index indicates a motion vector candidate for the current block in a motion vector candidate list generated for each reference picture list or for each reference picture index. At least one motion vector candidate index for each motion vector candidate list may be entropy encoded/decoded. Motion compensation may be performed on the current block by using at least one motion vector candidate index.

The motion vector difference indicates a difference value between a motion vector and a predicted motion vector. At least one motion vector difference may be entropy encoded/decoded for the motion vector candidate list generated for each reference picture list or each reference picture index for the current block. Motion compensation may be performed on the current block by using at least one motion vector difference.

When information on whether or not a skip mode is used (cu_skip_flag) has the first value of one, it may indicate the use of the skip mode. When it has the second value of zero, it may not indicate the use of the skip mode. Motion compensation of the current block may be performed using the skip mode based on the information on whether or not a skip mode is used.

When information on whether or not a merge mode is used (merge_flag) has the first value of one, it may indicate the use of the merge mode. When it has the second value of zero, it may not indicate the use of the merge mode. Motion compensation of the current block may be performed using the merge mode based on the information on whether or not a merge mode is used.

The merge index information (merge_index) may mean information indicating a merge candidate in a merge candidate list.

Also, the merge index information may mean information on a merge index.

Also, the merge index information may indicate a block that derived a merge candidate among reconstructed blocks spatially/temporally adjacent to the current block.

Also, the merge index information may indicate at least one piece of motion information of the merge candidate. For example, when the merge index information has the first value of zero, it may indicate the first merge candidate in the merge candidate list. When it has the second value of one, it may indicate the second merge candidate in the merge candidate list. When it has the third value of two, it may indicate the third merge candidate in the merge candidate list. In the same manner, when it has the fourth value to the N-th value, it may indicate the merge candidate corresponding to the value according to the order in the merge candidate list. Here, N may mean a positive integer including zero.

Motion compensation of the current block may be performed using the merge mode based on the merge index information.

Information on whether or not merge mode-based motion vector refining is used (fruc_flag) may mean information indicating whether or not merge mode-based motion vector refining is used. The information may be entropy encoded/decoded in at least one of a coding block and a prediction block.

For example, when the information on whether or not merge mode-based motion vector refining is used has the first value of one, it may indicate the use of the motion vector based on the merge mode. When it has the second value of zero, it may not indicate the use of the motion vector based on the merge mode. Here, the first value and the second value may differ.

However, without being limited thereto, whether or not to use motion vector refining may be determined based on other inter prediction modes (e.g., the skip mode, the AMVP mode, etc.) that are pre-defined in the encoder/decoder. That is, even when fruc_flag is not explicitly signaled, motion vector refining may be selectively used under a predetermined condition.

In the meantime, the information on whether or not merge mode-based motion vector refining is used (fruc_falg) may be entropy decoded, when information on whether or not a merge mode is used (merge_flag) has the first value indicating the use of the merge mode.

When two or more prediction blocks are generated during motion compensation for the current block, the final prediction block for the current block may be generated through a weighted sum for each prediction block. When calculating a weighted sum, at least one of a weighting factor and an offset may be applied for each prediction block. A weighted sum factor such as the weighting factor or the offset, etc. used in calculating a weighted sum may be entropy encoded/decoded for at least one of a reference picture list, a reference picture, a motion vector candidate index, a motion vector difference, a motion vector, information on whether or not a skip mode is used, information on whether or not a merge mode is used, and merge index information. Also, a weighted sum factor of each prediction block may be entropy encoded/decoded based on an inter prediction indicator. Here, the weighted sum factor may include at least one of a weighting factor and offset.

When information on motion compensation is entropy encoded/decoded in the CTU, motion compensation may be performed on all or some blocks existing in the CTU by using information on the motion compensation depending on a value of information on motion compensation.

When information on motion compensation is entropy encoded/decoded in the CTU or the sub-unit of the CTU, information on motion compensation may be entropy encoded/decoded based on at least one of the size and the depth of the predetermined block.

Here, information on the size or the depth of the predetermined block may be entropy encoded/decoded. Alternatively, information on the size or the depth of the predetermined block may be determined based on at least one of a preset value in the encoder and the decoder and a coding parameter or based at least one of another syntax element values.

Information on motion compensation may be entropy encoded/decoded in only a block that is larger than or equal to the predetermined block in size, and information on motion compensation may not be entropy encoded/decoded in a block that is smaller than the predetermined block in size. In this case, motion compensation may be performed on sub-blocks in a block that is larger than or equal to the predetermined block in size based on information on motion compensation that is entropy encoded/decoded in a block that is larger than or equal to the predetermined block in size.

That is, sub-blocks in a block that is larger than or equal to the predetermined block in size may share information on motion compensation including a motion vector candidate, a motion vector candidate list, a merge candidate, a merge candidate list, etc.

Information on motion compensation may be entropy encoded/decoded in only a block that is shallower than or equal to the predetermined block in depth, and information on motion compensation may not be entropy encoded/decoded in a block that is deeper than the predetermined block in depth. In this case, motion compensation may be performed on sub-blocks in a block that is shallower than or equal to the predetermined block in depth based on information on motion compensation entropy encoded/decoded in a block that is shallower than or equal to the predetermined block in depth. That is, sub-blocks in a block that is shallower than or equal to the predetermined block in depth may share information on motion compensation including a motion vector candidate, a motion vector candidate list, a merge candidate, a merge candidate list, etc.

Information on motion compensation may be entropy encoded/decoded by a block unit, and may be entropy encoded/decoded at a higher level. For example, information on motion compensation may be entropy encoded/decoded by a block unit such as a CTU, a CU, or a PU, etc., or may be entropy encoded/decoded at a higher level such as a video parameter set, a sequence parameter set, a picture parameter set, a adaptation parameter set, or a slice header, etc.

Information on motion compensation may be entropy encoded/decoded based on an information difference value on motion compensation indicating a difference value between information on motion compensation and an information prediction value on motion compensation.

Instead of entropy encoding/decoding information on motion compensation of the current block, information on motion compensation of an encoded/decoded block adjacent to the current block may be used as information on motion compensation of the current block.

Also, based on at least one of coding parameters, at least one piece of information on motion compensation may be derived.

Also, at least one piece of information on motion compensation may be entropy decoded from a bitstream based on at least one of coding parameters. At least one piece of information on motion compensation may be entropy encoded in a bitstream based on at least one of coding parameters.

Information on motion compensation may further include at least one of a motion vector, a motion vector candidate, a motion vector candidate index, a motion vector difference value, a motion vector prediction value, information on whether or not a skip mode is used (skip_flag), information on whether or not a merge mode is used (merge_flag), merge index information (merge_index), motion vector resolution information, overlapped block motion compensation information, local illumination compensation information, affine motion compensation information, decoder-side motion vector derivation information, and bi-directional optical flow information. Here, the decoder-side motion vector derivation may mean pattern matched motion vector derivation.

Motion vector resolution information may be information indicating whether or not particular resolution is used for at least one of a motion vector and a motion vector difference value. Here, resolution may mean precision. Also, particular resolution may set to at least one of a 16-pixel (16-pel) unit, a 8-pixel (8-pel) unit, a 4-pixel (4-pel) unit, an integer-pixel (integer-pel) unit, a ½-pixel (½-pel) unit, a ¼-pixel (¼-pel)

unit, a ⅛-pixel (⅛-pel) unit, a 1/16-pixel (1/16-pel) unit, a 1/32-pixel (1/32-pel) unit, and a 1/64-pixel (1/64-pel) unit.

Overlapped block motion compensation information may be information indicating whether or not the weighted sum of the prediction block of the current block is calculated by using a motion vector of the neighbor block spatially adjacent to the current block during motion compensation of the current block.

Local illumination compensation information may be information indicating whether or not at least one of a weighting factor value and an offset value is applied when generating the prediction block of the current block. Here, at least one of the weighting factor value and the offset value may be a value calculated based on a reference block.

Affine motion compensation information may be information indicating whether or not an affine motion model is used during motion compensation of the current block. Here, the affine motion model may be a model for partitioning one block into several sub-blocks by using a plurality of parameters, and calculating motion vectors of the partitioned sub-blocks by using representative motion vectors.

Decoder-side motion vector derivation information may be information indicating whether or not a motion vector required for motion compensation is used by being derived by the decoder. Information on a motion vector may not be entropy encoded/decoded based on decoder-side motion vector derivation information. Also, when decoder-side motion vector derivation information indicates that the decoder derives and uses a motion vector, information on a merge mode may be entropy encoded/decoded. That is, decoder-side motion vector derivation information may indicate whether or not a merge mode is used in the decoder.

Bi-directional optical flow information may be information indicating whether or not motion compensation is performed by correcting a motion vector for each pixel or sub-block. Based on bi-directional optical flow information, a motion vector for each pixel or sub-block may not be entropy encoded/decoded. Here, motion vector correction may modify a motion vector value from a motion vector for each block into a motion vector for each pixel or sub-block.

Motion compensation is performed on the current block by using at least one piece of information on motion compensation, and at least one piece of information on motion compensation may be entropy encoded/decoded.

When entropy encoding/decoding the information about motion compensation, a binarization method such as a truncated rice binarization method, a K-th order Exp_Golomb binarization method, a limited K-th order Exp_Golomb binarization method, a fixed-length binarization method, a unary binarization method or a truncated unary binarization method, etc. may be used.

When entropy encoding/decoding the information about motion compensation, a context model may be determined by using at least one piece of information about motion compensation of a neighboring block adjacent to the current block or area information of the neighbor block, information about previously encoded/decoded motion compensation or previously encoded/decoded area information, information about the depth of the current block, and information about the size of the current block.

Also, when entropy encoding/decoding the information about motion compensation, entropy encoding/decoding may be performed by using at least one piece of information about motion compensation of a neighboring block, information about previously encoded/decoded motion compensation, information about the depth of the current block, and information about the size of the current block as a prediction value for information about motion compensation of the current block.

Hereinafter, the motion vector refining method will be described in detail with reference to FIGS. 7 to 28.

In deriving the motion vector for the current block, the motion vector of the current block may be derived using at least one of a method of deriving a motion vector based on a skip/merge mode and a method of deriving a motion vector using an enhanced motion vector prediction mode. Here, deriving of the motion vector may include deriving the motion vector of the current block as well as deriving reference picture index information of the current block.

Hereinbelow, a merge mode-based motion vector refining method will be described. However, without being limited to the merge mode, the following description may be applied to a motion vector refining method based on other inter prediction modes.

The merge mode-based motion vector refining method may include at least one step of deriving an initial motion vector, deriving a refined motion vector based on the initial motion vector, and deriving a refined motion vector in sub-block units.

First, the deriving of the initial motion vector will be described in detail.

As shown in FIG. 7, the initial motion vector for the current block may be derived using the merge candidate of the merge candidate list derived from at least one of the spatial neighbor block and the temporal neighbor block.

In the meantime, an additional merge candidate list may be configured for merge mode-based motion vector refining.

Figure 8:
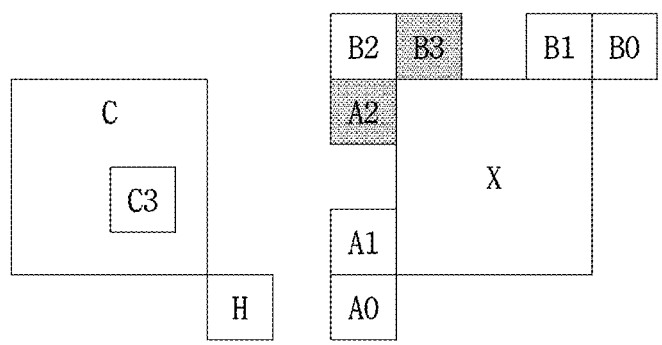
FIG. 8 is a view illustrating spatial neighbor blocks and temporal neighbor blocks for configuring an additional merge candidate list.

FIG. 8 is a view illustrating spatial neighbor blocks and temporal neighbor blocks for configuring an additional merge candidate list.

Referring to FIG. 8, in configuring the additional merge candidate list, a predetermined number of candidates from the spatial neighbor blocks A0, A1, A2, B0, B1, B2, and B3 are included the additional merge candidate list in the order of A1, B1, B0, A0, B2, B3, and A2, and then a candidate derived from the temporal neighbor block, a combined bi-prediction merge candidate, and a zero merge candidate are included in the additional merge candidate list so as to derive the initial motion vector.

In the meantime, in using the merge candidate of the merge candidate list, the initial motion vector for the current block may be derived using all or some merge candidates of the merge candidate list.

For example, when a merge candidate of the merge candidate list has motion information derived in sub-block units, the merge candidate may replace motion information derived from an additional spatial neighbor block and/or temporal neighbor block in configuring the merge candidate list may not be used as the initial motion vector.

FIGS. 9 and 10 are views illustrating configurations of an initial motion vector list.

When the merge candidate list is configured as shown in FIG. 9, from the merge candidates corresponding to each list direction, an initial motion vector list of the corresponding list direction may be configured as shown in FIG. 10. Here, the initial motion vector list may include at least one of the motion vector and the reference picture index.

For example, the initial motion vector list may use only the motion vector of the merge candidate list, and the reference picture index may use a fixed predetermined value. Here, the fixed predetermined value may be a value signaled from the encoder to the decoder, or may be a value set in the encoder and the decoder in common.

In the meantime, reference picture index information of the merge candidate of the merge candidate list is different from reference picture index information of the initial motion vector list, a motion vector scaled in consideration of the temporal distance (or the POC difference) may be used as the initial motion vector.

In the meantime, in configuring the initial motion vector list, when the same motion vector and reference picture index are included in the list, addition may not be performed.

FIG. 11 is a view illustrating a method of deriving an initial motion vector using merge index information. Among the merge candidates of the merge candidate list, motion information of the merge candidate corresponding to the merge index information may be used as the initial motion vector.

Referring to FIG. 11, when the value of the merge index information is 3, the L0 list [motion vector: (3, 1), reference picture index: 0] and the L1 list [motion vector: (−3, 1), reference picture index: 0] that are the fourth candidates in the merge candidate list may be derived as the initial motion vectors of respective list directions.

In the meantime, when the value of the merge index information is 4, only the L0 list [motion vector: (6, 2), reference picture index: 0] that is the fifth candidate of the merge candidate list may be used as the initial motion vector of the L0 list direction. Here, the merge index information may be index information for the merge mode.

However, initial motion vector index information used for merge mode-based motion vector refining may be further defined, and it may be entropy encoded/decoded for each encoding/decoding block.

In the meantime, in using the merge candidate of the merge candidate list, among the merge candidates of the merge candidate list, the motion vector of the merge candidate corresponding to a predetermined number may be set as the initial motion vector without entropy decoding the merge index information. Here, the predetermined number may be a number set in the encoder and the decoder in common.

For example, when the encoder/decoder use motion vectors that are the first candidate of the merge candidate list as the initial motion vectors, the L0 list [motion vector: (3, 1), reference picture index: 0] and the L1 list [motion vector: (−2, 0), reference picture index: 0] that are the first candidates of the merge candidate list in FIG. 11 may be used as the initial motion vectors of L0/L1 list directions.

In the meantime, in using the merge candidate of the merge candidate list, when the current block is a block where bi-prediction can be performed but has only one piece of motion information corresponding to the L0 or L1 list, motion information derived based on existing motion information may be used as additional initial motion information. Here, the existing motion information may be motion information of another merge candidate in the same list.

As described above, in deriving additional motion information based on the existing motion information, an additional initial motion vector to replace non-existing motion information may be derived in consideration of at least one of the reference picture indicated by the existing motion information, the current picture including the current block, and the temporal distance (or the POC difference) between reference pictures in the list requiring motion information generation.

Specifically, an additional initial motion vector to replace a non-existing motion vector may be derived performing at least one of mirroring and scaling an existing motion vector.

For example, when the value of the merge index information is 2 in FIG. 11, only the L0 motion information may exist.

In this case, the L0 motion vector mirrored based on the reference picture of the L1 reference picture list having the POC difference the same as the POC difference between the reference picture indicated by the L0 motion vector and the picture including the current block may be derived as the L1 list motion vector.

Also, among reference pictures of the L1 list, except for the reference picture having the same POC as the reference picture indicated by the L0 motion vector, a picture having the smallest POC difference from the current picture may be derived as the L1 reference picture, and the L0 motion vector scaled in consideration of the POC difference between the L0 reference picture and the current picture and the POC difference between the derived L1 reference picture and the current picture may be derived as the L1 direction motion vector.

Figure 12:
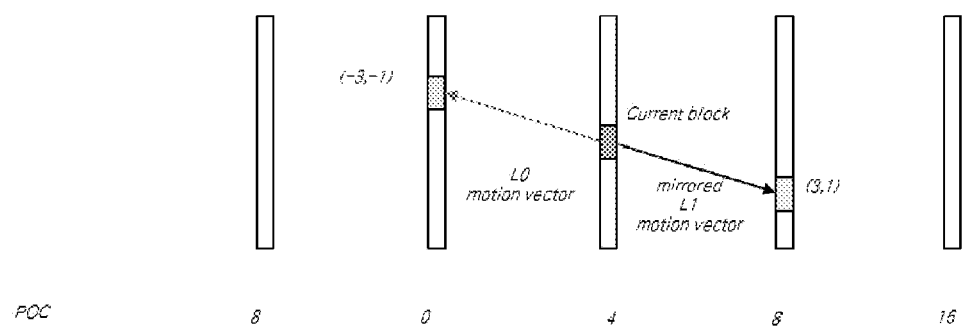
FIG. 12 is a view illustrating motion vector mirroring.

FIG. 12 is a view illustrating motion vector mirroring.

Referring to FIG. 12, the L0 motion vector mirrored based on the reference picture of the L1 reference picture list having the POC difference the same as the POC difference between the reference picture indicated by the L0 motion vector and the picture including the current block may be derived as the L1 list motion vector.

Specifically, since the POC of the reference picture indicated by the L0 motion vector is 0 and the POC of the current picture is 4, the POC difference between the two pictures may be calculated as 4. Since among reference pictures in the L1 list direction, there is a picture having the POC difference of 4 from the current picture, the motion vector generated by mirroring the L0 motion vector with respect to the relevant picture and the reference picture index of the relevant reference picture may be used as the L1 motion information. Here, the L1 motion vector generated by mirroring the L0 motion vector in the L1 list direction is (3, 1), and the L1 reference picture index is 0.

Figure 13:
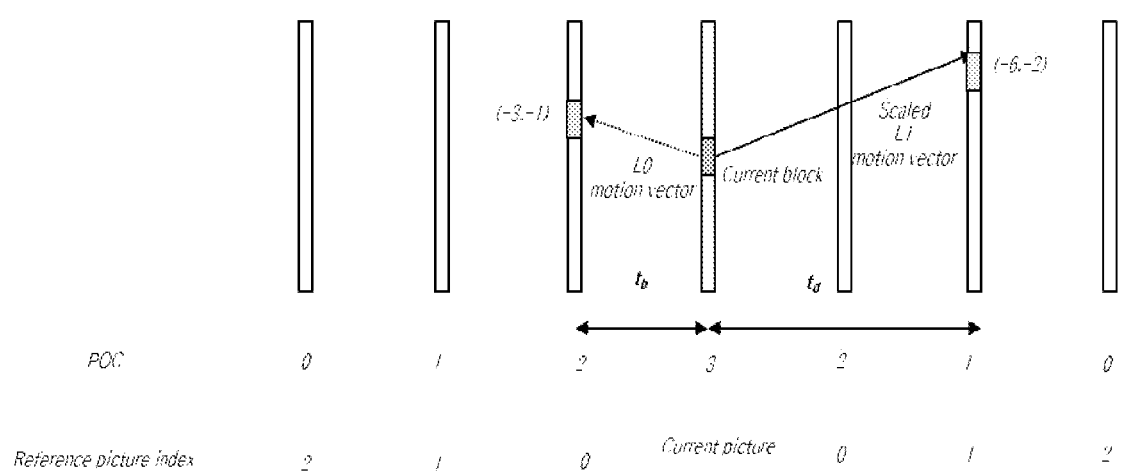
FIG. 13 is a view illustrating motion vector scaling.

FIG. 13 is a view illustrating motion vector scaling.

Referring to FIG. 13, among reference pictures of the L1 list, except for the reference picture having the same POC as the reference picture indicated by the L0 motion vector, a picture having the smallest POC difference from the current picture may be derived as the L1 reference picture, and the L0 motion vector scaled in consideration of the POC difference between the L0 reference picture and the current picture and the POC difference between the derived L1 reference picture and the current picture may be derived as the L1 direction motion vector.

Specifically, except for the reference picture (POC 2) indicated by the L0 motion vector, the picture (POC 1) having the smallest POC difference from the current picture may be derived as the L1 reference picture. The L0 motion vector scaled in consideration of the POC difference (tb) between the L0 reference picture and the current picture and the POC difference (td) between the derived L1 reference picture and the current picture may be derived as the L1 direction motion vector.

The process of scaling the motion vector may be performed as follows.

td may mean the difference between the picture order count for the current picture and the picture order count for the L1 reference picture of the current block. tb may mean the difference between the picture order count for the current picture and the picture order count for the L0 reference picture of the current block.

At least one of the td value and the tb value may be adjusted so that the td value or the tb value exists in a range of −128 to 127. Here, when the td value or the tb value is less than −128, the td value or the tb value may be adjusted to −128, and when the td value or the tb value is greater than 127, the td value or the tb value may be adjusted to 127. When the td value or the tb value is in the range of −128 to 127, the td value or the tb value may not be adjusted. That is, clipping of the tb value or the tb value may be performed such that the tb value or the tb value is in the range of predetermined values.

The tx value may be determined as (16384+Abs(td/2))/td. Here, an absolute value function is designated as Abs( ), and the output value of the function is the absolute value of the input value.

The scaling factor DistScaleFactor may be determined as (tb*tx+32)>>6, and the value of DistScaleFactor may be adjusted to be in a range of −1024 to 1023.

The scaled motion vector may be determined as Sign(DistScaleFactor*mv)*ffAbs(DistScaleFactor*my)+127)>>8). Here, Sign( ) s a function outputting sign information of a particular value. Sign(−1) outputs-. An existing motion vector value before being scaled may be designated as my.

FIG. 14 is a view illustrating an example of deriving an additional motion vector when only one motion vector corresponding to an L0 or L1 list exists in a block where bi-prediction can be performed. In using the merge candidates of the merge candidate list, when the current block is a block where bi-prediction can be performed but has only one motion vector corresponding to the L0 or L1 list, an additional motion vector may be derived from the merge candidate list of the prediction direction where a motion vector is absent.

Referring to FIG. 14, when the merge index information value is 2, only the L0 motion vector exists. In this case, the n-th available motion vector in the L1 list may be used as the initial L1 motion vector of the current block. Here, n is a value set in the encoder/decoder in common, and may be a positive integer including 1.

FIG. 15 is a view illustrating an example of selecting a merge candidate having bi-directional motion information in a block where bi-prediction can be performed as an initial motion vector. In using the merge candidates of the merge candidate list, when the current block is a block where bi-prediction can be performed, the merge candidate having bi-directional motion information in the merge candidate list may be used as the initial motion vector. Here, when there are multiple candidates having bi-directional motion information in the merge candidate list, the candidate having the smallest merge index information may be used.

Referring to FIG. 15, when the current block is a block where bi-prediction can be performed, the motion vector corresponding to the merge candidate index of 3 having bi-directional motion information which can be used as first may be used as the initial motion vector.

When the reference picture satisfying the condition is absent, motion information of the merge candidate selected by the existing merge index information may be derived as the initial motion vector.

In the meantime, in performing motion refining based on the initial motion vector derived in the described manner, when the initial motion vector has a sub-pixel motion vector, motion refining may be performed based on the motion vector rounded to the near integer pixel position.

For example, in the case of 1/16 motion vector precision, rounding to the integer pixel position may be performed through the following formula 4. The shift value differs depending on the precision. In the case of 1/16 motion vector precision, the shift value may be 4, and in the case of 1/8 motion vector precision, the shift value may be 3.

$$\text{round}MV(x,y)=((MV_x+(1<<\text{shift}-1))>>\text{shift})<<\text{shift},\\((MV_y+(1<<\text{shift}-1))>>\text{shift})<<\text{shift} \quad \text{[Formula 4]}$$

Next, the deriving of the refined motion vector based on the derived initial motion vector will be described in detail.

The encoder/decoder may perform motion vector refining in block units using the derived initial motion vector.

In refining the motion vector, the spatial neighbor block and/or the temporal neighbor block of the current block may be used in refining the initial motion vector. A reconstruction pixel of the spatial neighbor block and/or the temporal neighbor block used in refining the motion vector may be defined as a template.

For example, the encoder/decoder may configure the template with spatial neighbor reconstruction pixels of the current block, and may perform refining on the initial motion vector by using the template.

FIGS. 16 to 21 are views illustrating templates according to an embodiment of the present invention.

Figure 16:
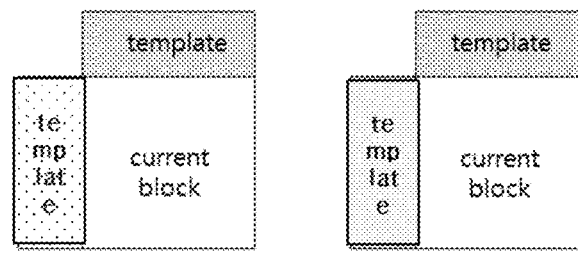
FIGS. 16 to 21 are views illustrating templates according to an embodiment of the present invention.

In configuring the template, the template may be configured using pixels of the top and/or left neighbor reconstruction block of the current block as shown in FIG. 16.

Here, when pixels of the top or left neighbor reconstruction block of the current block are unavailable, the template may be configured using only pixels of an available block.

Figure 17:
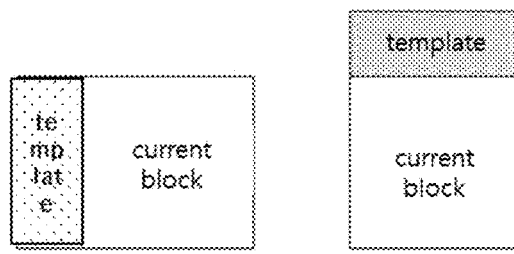

For example, as shown in FIG. 17, when the top neighbor reconstruction block of the current block is unavailable as the picture boundary, the slice boundary, the tile boundary, or the CTU boundary, the template may be configured using only pixels of the left neighbor reconstruction block. When the left neighbor reconstruction block of the current block is unavailable as the picture boundary, the slice boundary, the tile boundary, or the CTU boundary, the template may be configured using only pixels of the top neighbor reconstruction block.

Also, in configuring the template, unavailable pixels may be replaced with available pixels to configure the template. Here, the available pixel may be a neighbor pixel of the current block, a pixel derived applying an interpolation filter to neighbor pixels, or a pixel having a pre-defined value in the encoder/decoder. In the meantime, the template may be configured using a prediction pixel value rather than a reconstructed pixel value.

In configuring the template, when the motion vector has a sub-pixel unit, the pixel value of the relevant position may be generated applying the interpolation filter. Here, a filter used in interpolation may be a bi-linear filter, an 8-tap DCT-IF filter, etc. Without transmitting information on the interpolation filter used in configuring the template, the encoder/decoder may use the same predetermined method, and information on the interpolation filter type may be signaled as being included in a bitstream.

In the meantime, the size of the template may be M×N and, M and N may be positive integers.

Figure 18:
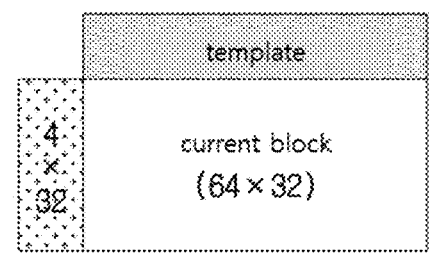

For example, as shown in FIG. 18, when the size (width× height) of the current block is 64×32 and the pixel length of the template pre-defined in the encoder/decoder is 4 pixels, the size of the top template may be 64×4 and the size of the left template may be 4×32.

Here, the length of the pixel may be calculated depending on the precision of the motion vector.

For example, when the precision of the motion vector is ¼ unit and the block size is 16 pixels, the pixel length of the template may be calculated as 4 pixels.

Figure 19:
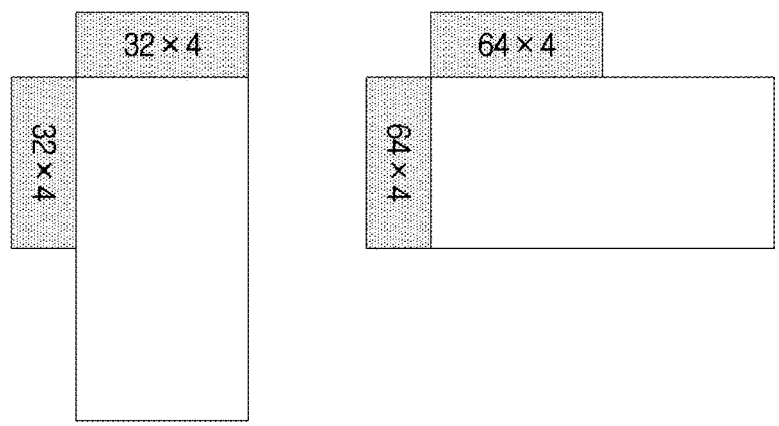

In the meantime, in configuring the template, when the width/height of the current block are different as shown in FIG. 19, the sizes of the top template and the left template may be the same.

In the meantime, in configuring the template, when the size of the template is M×N, M of the top template may have a value greater than the width of the current block and N may have the pixel length fixed in the encoder/decoder. N of the right template may have a value greater than the height of the current block, and M may have the pixel length fixed in the encoder/decoder.

Figure 20:
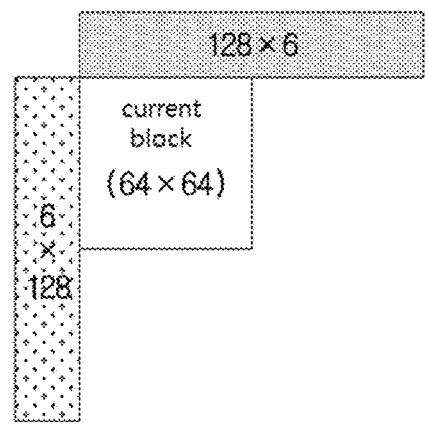

For example, as shown in FIG. 20, when the size of the current block is 64×64 and the pixel length of the template defined by the encoder/decoder is 6 pixels, the size of the top template may be 128×6 and the size of the left template may be 6×128.

In the meantime, in configuring the template, the size of the template may be M×N, and M and N may be equal to the width/height of the current block.

Figure 21:
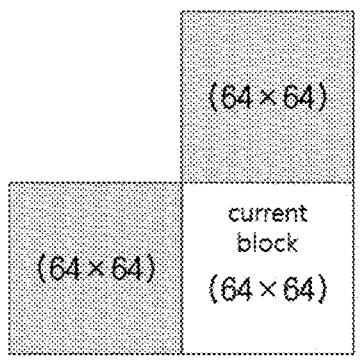

For example, when the size of the current block is 64×64 as shown in FIG. 21, the size of the left template may be 64×64 and the size of the top template may be 64×64.

In the meantime, in configuring the template, the size of the template may be M×N, and the templates of opposite sizes may be used depending on the size or depth information of the current block.

For example, when the size of the current block is 128×64 and the width or the height is greater than 32, the size of the top template may be 128×6 and the size of the left template may be 6×64.

For example, when the size (width×height) of the current block is 16×16 and the width or the height is less than 32, the size of the top template may be 16×2 and the size of the left template may be 2×16.

In the meantime, template size information required in configuring the template may be signaled as being included in a bitstream.

Figure 22:
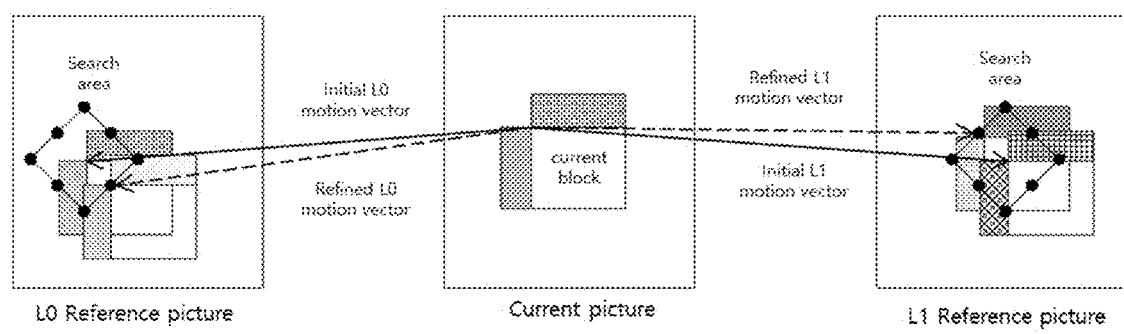
FIG. 22 is a view illustrating an example of refining an initial motion vector by using a template.

FIG. 22 is a view illustrating an example of refining an initial motion vector by using a template.

Referring to FIG. 22, the motion vector indicating a template minimizing the error with the neighbor template of the current block is searched for in the search area of the reference picture indicated by the initial motion vector, and the motion vector may be determined as the refined motion vector.

Here, the template in the reference picture may be generated based on a particular search area including the pixel position indicated by the initial motion vector.

A particular search area centered on the pixel position indicated by the initial motion vector may be differently applied depending on a search method in cross, square, diamond, hexagon shapes, etc. In the meantime, minimizing the error between the template in the reference picture and the neighbor template of the current block may mean minimizing the difference between the template in the reference picture and the neighbor template of the current block.

In calculating the error between the template in the reference picture and the neighbor template of the current block, the error may be calculated in consideration of at least one of a distortion value and a cost value for the motion vector.

For example, when left and top templates are available, the cost value may be calculated as follows.

Cost value=(distortion value between left templates+ distortion value between *top* templates)+(initial motion vector (x,y)−refined motion vector (x,y))* weighting factor For example, when only the top template is available, the cost value may be calculated as follows.

Cost value=distortion value between *top* templates+ (initial motion vector (x,y)−refined motion vector (x,y))*weighting factor Here, in calculating of the cost value, the weighting factor may have a negative number less than 0 or a positive number greater than 0.

In the meantime, the distortion value may be calculated using at least one of SAD and MR-SAD between templates.

$$SAD=\Sigma_{i,j}|Ctp(i,j)|: MR\text{-}SAD=\Sigma_{i,j}|Ctp(i,j)-Ltp(i,j)-deltaDC|: \quad \text{[Formula 5]}$$

Here, Ctp(i,j) may mean the left or top template pixel value of the current block, Ltp(i,j) may mean the left or top template pixel value in the reference picture, and detlatDC may mean (the left template average pixel value of the current block—the left template average pixel value in the reference picture) or (the top template average pixel value of the current block—the top template average pixel value in the reference picture).

In a particular search area centered on the pixel position indicated by the refined motion vector (rMV) obtained based on the initial motion vector, a new motion vector (nMV) indicating a template minimizing the error with the template of the current block may be found.

Here, when the error between the template of the reference picture and the template of the current block obtained from the new motion vector (nMV) is greater than the error between the template of the reference picture and the template of the current block obtained from the refined motion vector (rMV), the refining process may not be further performed.

However, when the error between the template of the reference picture and the template of the current block obtained from the new motion vector (nMV) is less than the error between the template of the reference picture and the template of the current block obtained from the refined motion vector (rMV), another new motion vector may be obtained and refined in a particular search area centered on the pixel position indicated by the new motion vector (nMV).

In the meantime, when the error between the template of the reference picture and the template of the current block obtained from the new motion vector (nMV) is less than the error between the template of the reference picture and the template of the current block obtained from the refined motion vector (rMV), searching for a new motion vector may be repeated. In this case, searching for the new motion vector may be limited based on information on the number of times of performing motion refining.

For example, when the information on the number of times of performing motion refining has a value of 2, searching for the new motion vector may be limited to two times in total.

The information on the number of times of performing motion refining may be signaled as being included in a bitstream.

In the meantime, the number of times of performing motion refining may be a particular value that is preset in both the encoder and the decoder.

In the meantime, when the initial motion vector has motion vectors for N prediction directions, such as an L0 motion vector, an L1 motion vector, etc., a refined motion vector for the motion vector may be obtained from each prediction direction.

In the meantime, a particular search area may be determined based on search area information. Here, search area information required to determine the search area may be signaled as being included in a bitstream.

The size of the particular search area may differ depending on the coding parameter, such as the picture type, the temporal layer, the block size, etc. For example, when the size of the search area of the picture corresponding to the highest layer can have a 1 integer pixel size, the size of the search area of the picture corresponding to the lower layers may have an 8 integer pixel size.

Figure 23:
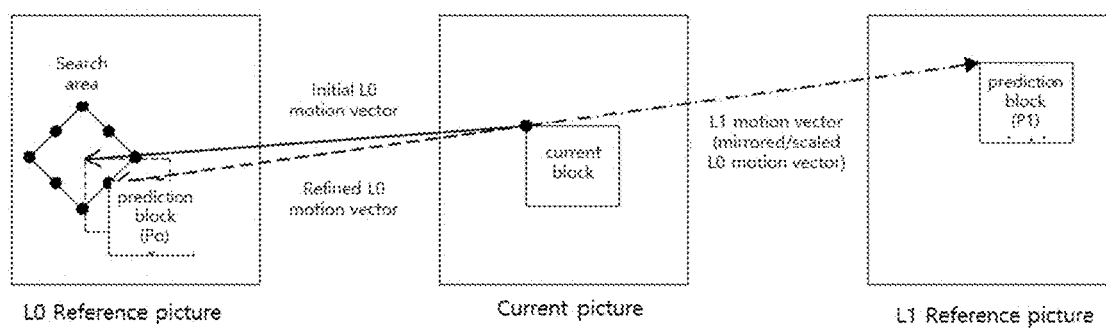
FIGS. 23 to 25 are views illustrating an example of refining an initial motion vector by using prediction blocks of a current block.
Figure 24:
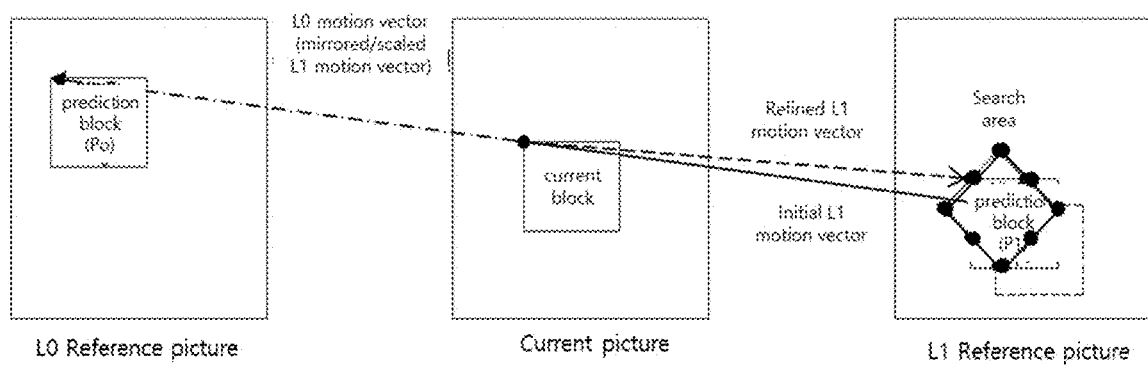
Figure 25:
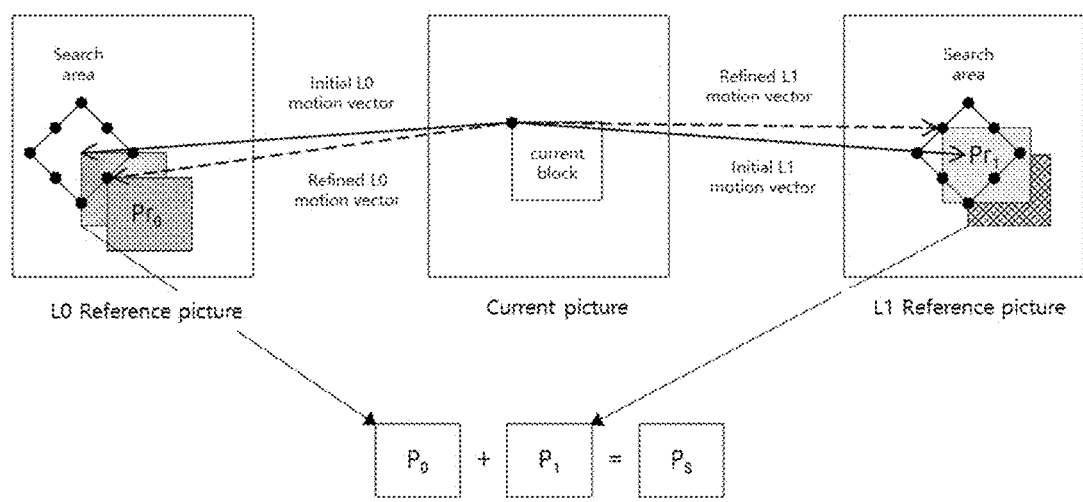

FIGS. 23 to 25 are views illustrating an example of refining an initial motion vector by using prediction blocks of a current block. Refining of the initial motion vector may be performed using the prediction blocs of the current block generated from the motion vector without using the template described in FIG. 22.

In performing motion refining using the prediction blocks, the motion vector may be refined based on the difference between the prediction blocks in each reference picture indicated by the initial motion vector.

Here, the prediction block may be positioned in a particular search range centered on the pixel position indicated by the initial motion vector. The prediction block is generated from the motion vector derived from a particular search range, and the motion vector minimizing the difference between prediction blocks may be determined as the refined motion vector.

The difference between prediction blocks may mean the difference between multiple prediction blocks generated based on an initial motion vector in the L0 direction (hereinafter, referred to as "an L0 initial motion vector") or an initial motion vector in the L1 direction (hereinafter, referred to as "an L1 initial motion vector"), or may mean the difference between prediction blocks respectively generated based on the L0 initial motion vector and the L1 initial motion vector.

For example, as shown in FIG. 23, the motion vector minimizing the error between the prediction block P0 generated from the motion vector shifted within a particular search range centered on the pixel position in the L0 reference picture indicated by the L0 initial motion vector and the prediction block P1 generated from the L1 motion vector derived based on the L0 motion vector may be determined as the refined motion vector. Here, the L1 motion vector may be a motion vector derived by mirroring or scaling the initial L0 motion vector or the L0 motion vector shifted within the particular search range.

As another example, as shown in FIG. 24, the motion vector minimizing the error between the prediction block P1 generated from the motion vector shifted within a particular search range centered on the pixel position in the L1 reference picture indicated by the L1 initial motion vector and the prediction block P0 generated from the L0 motion vector derived based on the L1 motion vector may be defined as the refined motion vector. Here, the L0 motion vector may be a motion vector derived by mirroring or scaling an L1 initial motion vector or the L1 motion vector shifted within the particular search range.

In the meantime, in deriving the Ly direction motion vector from the Lx motion vector, at least one of the reference picture indicated by the Lx motion vector, the picture having the current block, and the temporal distance (or the POC difference) between reference pictures in the Ly direction may be considered. Here, x and y may be different positive integers including 0.

As an example of mirroring, the L0 motion vector mirrored based on the reference picture of the L1 reference picture list having the same POC difference as the POC difference between the reference picture indicated by the L0 motion vector and the picture having the current block may be derived as the L1 directional motion vector.

As an example of scaling, among reference pictures of the L1 reference picture list, except for the reference picture having the same POC as the reference picture indicated by the L0 motion vector, the L0 motion vector scaled in consideration of the POC difference based on a picture having the smallest POC difference from the current picture may be derived as the L1 directional motion vector.

In the meantime, in performing motion refining using prediction blocks, motion refining may be performing using the block generated by weighted summing of the prediction block generated from the L0 initial motion vector and the prediction block generated from the L1 initial motion vector.

For example, as shown in FIG. 25, the prediction block Ps generated by weighted summing of the prediction block P0 generated from the L0 initial motion vector and the prediction block P1 generated from the L1 initial motion vector may be set to a template. The prediction block Pr0 may be generated shifting the motion vector within a particular search range centered on the pixel position indicated by the L0 initial motion vector. Here, the motion vector minimizing the error between the generated prediction block (Pr0) and the template (Ps) may be determined as the refined motion vector in the L0 list direction.

Also, the prediction block (Pr1) may be generated shifting the motion vector within a particular search range centered on the pixel position indicated by the L motion vector. Here, the motion vector minimizing the error between the generated prediction block (Pr1) and the template (Ps) may be determined as the refined motion vector in the L1 list direction.

In the meantime, the prediction block (Ps) may be calculated as follows.

$$Ps=(a1*P0+a2*P1)>>1$$

Here, a1 and a2 are weighting factors used in weighted summing. The weighting factor is not limited to a fixed value, and may be a variable value. The weighting factors applied to each prediction block may be the same or different from each other. In order to apply a variable weighting factor, weighting factor information for a decoding target block may be signaled as being included in a bitstream.

In the meantime, when only the L0 initial motion vector is derived, only the prediction block P0 generated from the L0 initial motion vector may be set as a template. The motion vector minimizing the error between the template and the prediction block Pr0 generated shifting the motion vector within a particular search range centered on the pixel position indicated by the L0 initial motion vector may be determined as the refined motion vector in the L0 list direction.

In the meantime, in calculating the difference between the current block and the prediction block, the difference between prediction blocks may be calculated in consideration of at least one of a distortion value and a cost value for the motion vector.

For example, when prediction blocks P0 and P1 are generated using the L0 initial motion vector, the cost value may be calculated as follows.

Cost value=distortion value (prediction block P0−prediction block P1)+(initial L0 motion vector−refined L0 motion vector)*weighting factor For example, when prediction blocks P0 and P1 are generated using the L1 initial motion vector, the cost value may be calculated as follows.

Cost value=distortion value (prediction block P0−prediction block P1)+(initial L1 motion vector−refined L1 motion vector)*weighting factor Here, in calculating of the cost value, the weighting factor may have a negative number less than 0 or a positive number greater than 0.

In the meantime, in calculating of the cost value, the distortion value may be calculated using at least one of SAD, SATD, and MR-SAD between prediction blocks.

In a particular search area centered on the pixel position indicated by the refined motion vector (rMV) obtained based on the initial motion vector, the new motion vector (nMV) minimizing the error between the prediction blocks is searched for.

Here, when the error between the prediction blocks P0 and P1 obtained from the new motion vector (nMV) is greater than the error between the prediction blocks P0 and P1 obtained from the refined motion vector (rMV), the refining process may not be further performed. However, when the error between the prediction blocks P0 and P1 obtained from the new motion vector (nMV) is less than the error between the prediction blocks P0 and P1 obtained from the refined motion vector (rMV), another new motion vector is searched for in a particular search area centered on the pixel position indicated by the new motion vector (nMV) to refine the another new motion vector.

In the meantime, when the error between the prediction blocks obtained from the new motion vector is less than the error between the prediction blocks obtained from the refined motion vector, searching for a new motion vector may be repeated. In this case, searching for the new motion vector may be limited based on the information on the number of times of performing motion refining.

For example, when the information on the number of times of performing motion refining has a value of 2, searching for the new motion vector may be limited to two times in total.

The information on the number of times of performing motion refining may be signaled as being included in a bitstream. In the meantime, the number of times of performing motion refining may be a particular value that is preset in both the encoder and the decoder.

As described above, there are motion vector refining methods based on an initial motion vector by using a template and a prediction block.

The encoder/decoder may select one of the motion vector refining methods by using motion vector refining mode information (MV_REFINE_MODE) that indicates the motion vector refining method.

For example, when the motion vector refining mode information (MV_REFINE_MODE) has the first value of 0, the motion vector may be refined using the neighbor template of the current block. In contrast, when the motion vector refining mode information (MV_REFINE_MODE) has the second value of 1, the motion vector may be refined using the prediction blocks obtained from the motion vector. Here, the first value and the second value may be respectively set to 1 and 0.

In the meantime, the motion vector refining mode information may be signaled as being included in a bitstream.

In the meantime, the motion vector refining method may be determined depending on the coding parameter.

For example, when the initial motion vector of the current block has the uni-directional motion vector, the motion vector may be refined using the neighbor template. When the initial motion vector of the current block has the bi-directional vector, the motion vector may be refined using a prediction block signal obtained from the motion vector.

The encoder/decoder may select the motion vector refining method by using the coding parameter rather than the motion vector refining mode information. For example, when the current block can use only the L0 or L1 motion vector, the motion vector can be refined using the neighbor template. When the current block can use both the L0 and L1 motion vectors, the motion vector of each prediction direction may be refined using, as the template, the prediction block generated by weighted summing the prediction block obtained from the motion vector. As another example, when the current block can use only the L0 or L1 motion vector, the motion vector can be refined using the neighbor template. When the current block can use both the L0 and L1 motion vectors, the motion vector of each prediction direction may be refined using the difference between prediction blocks obtained from the motion vector of each prediction direction.

In the meantime, in deriving the motion vector for the current block, the initial motion vector may be used as the motion vector of the current block without refining the initial motion vector.

Next, the deriving of the refined motion vector in sub-block units will be described in detail.

The current block may be partitioned into one or more sub-blocks.

For example, the current block may be partitioned into M*N sub-blocks by dividing the current block into N sub-blocks in the horizontal direction and M sub-blocks in the vertical direction. M and N may be arbitrary integers equal to or greater than 1. M and N may be the same or different integers.

Alternatively, the current block may be partitioned into W*H sub-blocks having W pixels in the horizontal direction and H pixels in the vertical direction. W and H may be arbitrary integers equal to or greater than 2. W and H may be the same or different integers.

The size of the sub-block may be determined depending on the size of the current block.

For example, when the size of the current block is equal to or less than K samples, a 4×4 sub-block may be used. When the size of the current block is greater than N samples, a 8×8 sub-block may be used. Here, K is a positive integer, e.g., 256.

In the meantime, the size of the sub-block may be predetermined in the encoder and the decoder.

In the meantime, the size of the sub-block may be determined based on sub-block size information. The sub-block size information may be signaled as being included in a bitstream.

Also, in calculating the size of the sub-block, both sub-block size information and current block size information may be considered in determining the size of the sub-block.

For example, when the sub-block size information indicates sub-block depth information, the size of the sub-block may be determined using the width/height of the current block and the sub-block depth information as follows.

Size of sub-block=(average of width/height of block>>sub-block depth information)

Figure 26:
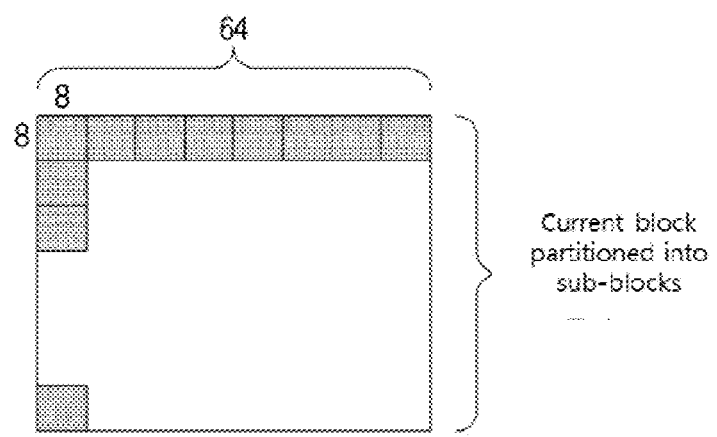
FIGS. 26 and 27 are views illustrating a sub-block.

For example, as shown in FIG. 26, when an average of the width/height of the block is 64 and the sub-block depth information has a value of 3, the size of the sub-block may be determined as 8.

The sub-block may have at least one of a square shape and a rectangular shape.

Figure 27:
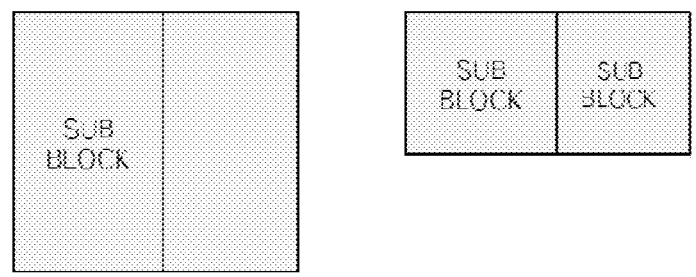

For example, as shown in FIG. 27, when the current block has a square shape, the sub-block may have a rectangular shape. When the current block has a rectangular shape, the sub-block may have a square shape.

Figure 28:
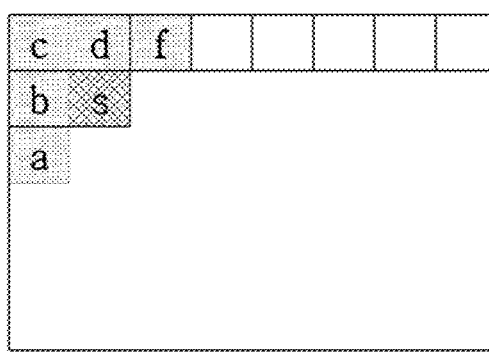
FIG. 28 is a view illustrating an example of setting an initial motion vector for motion vector refining in sub-block units.

The encoder and the decoder may set the initial motion vector for motion vector refining in sub-block units by using at least one of the following methods.
  (1) The initial motion vector determined in block units or the refined motion vector may be set as the initial motion vector in sub-block units.
  (2) The zero motion vector (0,0) may be set as the initial motion vector in sub-block units.
  (3) The motion vector derived from the reconstructed block from the collocated picture, which is the temporal neighbor of the sub-block, may be set as the initial motion vector in sub-block units.
  (4) The motion vector derived through merge in sub-block units may be set as an initial value of the initial motion vector in sub-block units.
  (5) The motion vector of the sub-block adjacent to the left and top of the current sub-block may be set as the initial motion vector in sub-block units. For example, as shown in FIG. 28, motion vectors of the left sub-block (b), the lower left sub-block (a), the upper left sub-block (c), the upper sub-block (d), and the upper right sub-block (f) of the current sub-block (s) may be used as the initial motion vector of the current sub-block.

Among the initial motion vectors of at least one sub-block unit set by the methods (1) to (5), only the initial motion vector having the same value as reference picture index information of the motion information determined in block units may be used.

However, when the initial motion vector is different from the reference picture index information of the motion information determined in block units, a scaled value considering the temporal distance may be used as the initial motion vector in sub-block units.

In obtaining the initial motion vector for motion vector refining in sub-block units, reference picture index information of sub-blocks may be set to the same particular value.

For example, reference picture index information of all sub-blocks may be set to a value of 0.

Thus, when the motion information determined in the block units and the reference picture index information of the motion information derived from the neighbors do not have value of 0, the motion vector is scaled considering the temporal distance, and then may be used as the initial motion vector of the relevant sub-block.

The encoder and the decoder may perform motion vector refining in sub-block units by using the derived initial motion vector.

The encoder and the decoder use the spatial neighbor blocks and/or the temporal neighbor blocks of the current block to perform refining on the initial motion vector of the sub-block through at least one of the motion vector refining method using the above-described template and the motion vector refining method using the prediction block.

In the meantime, information on motion compensation may include information on whether or not merge mode-based motion vector refining is used that may be used in the motion vector refining method, template size information, search area information, weighting factor information, information on the number of times of performing motion refining, motion vector refining mode information, and sub-block size information.

Since entropy encoding/decoding information on motion compensation has been described in detail with reference to step S504 of FIG. 5 and step S601 of FIG. 6, it will be omitted.

When the AMVP mode rather than the merge mode is applied to the current block and at least one motion vector candidate exists, the generated motion vector candidate list may be used to derive a refined motion vector candidate.

For example, when at least one of a motion vector of a reconstructed neighbor block, motion vector of a col block, and a motion vector of a block adjacent to the col block is determined as a motion vector candidate and a motion vector candidate list is generated, the generated motion vector candidate may be used as the initial motion vector and the refined motion vector may be derived through the motion vector refining method using the template.

Here, when N motion vector candidates exist, the motion vector candidate minimizing the difference between the template in the reference picture and the neighbor template of the encoding/decoding target block may be used as the refined motion vector.

In the meantime, when the determined refined motion vector candidate has the motion vector value different from the motion vector value of the first motion vector candidate of the motion vector candidate list, the determined refined motion vector candidate may be used as the first candidate of the motion vector candidate list. In this case, the position of existing motion vector candidates in the list may be incremented by one step and the N-th candidate may be removed from the list.

For example, when one motion vector candidate is determined from the motion vector of the reconstructed neighbor block, the motion vector of the col block, and the motion vector of the block adjacent to the col block, the motion vector candidate may be used as the initial motion vector and the refined motion vector may be derived through the motion vector refining method using the template.

In the meantime, when the determined refined motion vector candidate has the refined motion vector value different from the refined motion vector value of the first motion vector candidate of the motion vector candidate list, the refined motion vector candidate may be used as the second candidate of the motion vector candidate list.

In the meantime, in configuring the merge candidate list and the motion vector candidate list, when the spatial/temporal candidate blocks are encoded/decoded using the motion refining method, relevant candidates may not included in the lists.

Also, for the encoded/decoded block through the motion refining method, overlapped block motion compensation (OMBC), a bi-directional optical flow (BIO)-based motion refining method, etc. may not be further applied.

Also, local illumination compensation information for the encoded/decoded block through the motion refining method may be derived from a candidate block corresponding to merge index information.

Figure 29:
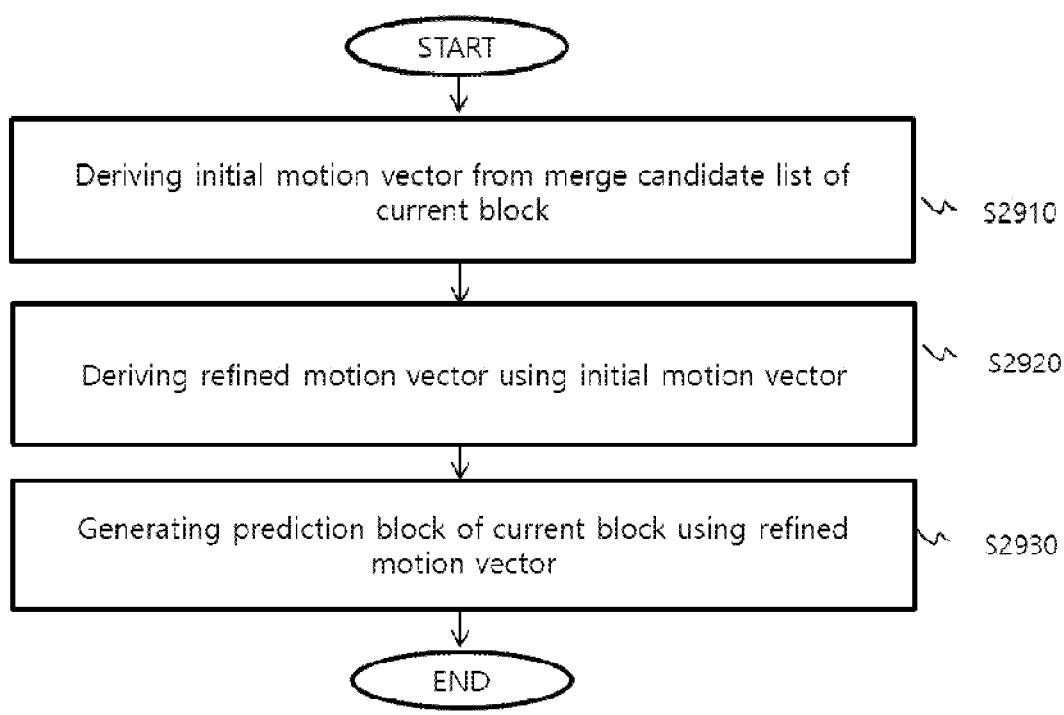
FIG. 29 is a flowchart illustrating a method for decoding an image according to an embodiment of the present invention.

FIG. 29 is a flowchart illustrating a method for decoding an image according to an embodiment of the present invention.

Referring to FIG. 29, the decoder may derive an initial motion vector from a merge candidate list of a current block at step S2910.

In this case, the initial motion vector may be derived from a merge candidate indicated by merge index information in the merge candidate list.

In the meantime, when the current block is a block where bi-prediction can be performed and the merge candidate indicated by the merge index information has motion information in only one prediction direction, the motion vector of the existing motion information may be mirrored or scaled to derived the initial motion vector in a prediction direction where the motion information is absent. Since a detailed description thereof has been described with reference to FIGS. 12 and 13, it will be omitted.

The decoder may derive the refined motion vector by using the initial motion vector at step S2920.

Specifically, in the deriving of the refined motion vector at step S2920, the motion vector indicating the template minimizing the difference with the neighbor template of the current block is searched for in the search area of the reference picture indicated by the initial motion vector, and the motion vector indicating the template minimizing the difference may be derived as the refined motion vector.

Here, the particular search area may be determined as an area centered on the pixel position of the reference picture indicated by the initial motion vector, the area having at least one of cross, square, diamond, and hexagon shapes.

The motion vector indicating the template minimizing the difference between neighbor templates of the current block in the search area of the reference picture indicated by the initial motion vector may be searched for based on at least one of the distortion value between templates and the cost value for the motion vector.

In the meantime, in the deriving of the refined motion vector at step S2920, the refined motion vector may be derived based on at least one prediction block indicated by the initial motion vector.

Here, when the current block is a bi-directional prediction block, a weighted sum of the first prediction block indicated by the first prediction direction initial motion vector and the second prediction block indicated by the second prediction direction initial motion vector may be set as a template, and a search area of at least one reference picture indicated by at least one of the first prediction direction initial motion vector and the second prediction direction initial motion vector may be set, such that the motion vector indicating the third prediction block minimizing the difference with the template in the search area may be derived as the refined motion vector. Here, when the first search area indicated by the first prediction direction initial motion vector and the second search area indicated by the second prediction direction initial motion vector are set, the refined motion vector may be derived using motion vectors indicating prediction blocks minimizing the difference with the template in the first search area and the second search area.

In the meantime, when the first prediction direction initial motion vector or the second prediction direction initial motion vector is absent, the existing initial motion vector may be mirrored or scaled to derive a non-existing initial motion vector.

A prediction block of the current block may be generated using the refined motion vector at step S2930.

In the method for decoding an image, the current block may be a sub-block of a decoding target block. In this case, the motion vector may be refined in sub-block units.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in an apparatus for encoding/decoding an image.

The invention claimed is:

1. A method for decoding an image, the method comprising:
    decoding an initial motion vector index information of a current block indicating a merge candidate used as an initial motion vector for deriving a refined motion vector;
    deriving an initial motion vector, based the initial motion vector index information, from a merge candidate list of the current block;
    decoding motion compensation information of the current block indicating a motion vector difference;
    deriving a refined motion vector indicating a position in a cross shape region based on the motion compensation information; and
    generating a prediction block of the current block using the refined motion vector,
    wherein the cross-shape region is based on a position indicated by the initial motion vector.

2. The method of claim 1, wherein the deriving of the initial motion vector comprises, deriving a motion vector of a merge candidate corresponding to a predetermined number of the merge candidate list as the initial motion vector, in response to the initial motion vector index information not being decoded.

3. The method of claim 2, wherein the merge candidate corresponding to the predetermined number is the first merge candidate of the merge candidate list.

4. The method of claim 1, further comprising:
    obtaining merge mode usage information; and
    obtaining merge mode based motion vector refine usage information based on the merge mode usage information.

5. A method for encoding an image, the method comprising:
    deriving an initial motion vector from a merge candidate list of a current block;
    deriving a refined motion vector indicating a position in a cross-shape region based on motion compensation information;
    generating a prediction block of the current block using the refined motion vector;
    encoding initial motion vector index information of the current block indicating a merge candidate used as the initial motion vector in the merge candidate list; and
    encoding the motion compensation information of the current block indicatin motion vector difference value,
    wherein the cross-shape region is determined based on a position indicated by the initial motion vector.

6. The method of claim 5, further comprising:
    encoding merge mode usage information; and
    encoding merge mode based motion vector refine usage information based on the merge mode usage information.

7. An apparatus comprising:
    a non-transitory computer readable recording medium storing a bitstream decoded by an image decoder, the bitstream including initial motion vector index information and motion compensation information;
    the initial motion vector index information is used to indicate an initial motion vector in a merge candidate list of a current block for deriving a refined motion vector;
    the motion compensation information is used to indicate a motion vector difference value of the current block for deriving the refined motion vector; and
    the initial motion vector based on the initial motion vector index information and the motion vector difference value based on the motion compensation information are used to derive the refined motion vector,
    wherein the refined motion vector indicates a position in a cross-shape region based on the motion compensation information, and
    wherein the cross-shape region is determined based on a position indicated by the initial motion vector.

* * * * *